United States Patent [19]

Ophir et al.

[11] Patent Number: 4,923,066

[45] Date of Patent: May 8, 1990

[54] SMALL ARMS AMMUNITION INSPECTION SYSTEM

[75] Inventors: Zohar Ophir, Tel Aviv; Michael Golstein, Herzlia Pituach; Miriam Nagler, Tel Aviv, all of Israel

[73] Assignee: Elor Optronics Ltd., Tel Aviv, Israel

[21] Appl. No.: 105,600

[22] Filed: Oct. 8, 1987

[51] Int. Cl.⁵ ........................ B07C 5/342; G05B 23/02

[52] U.S. Cl. .................................... 209/538; 209/556; 209/580; 209/585; 209/587; 364/552; 364/579; 382/8

[58] Field of Search ............... 209/509, 538, 546, 548, 209/549, 552, 555, 556, 563, 564, 576, 577, 580, 585, 587, 909, 911, 919, 933, 939; 73/167; 356/426; 358/101, 106; 364/551, 552, 579, 580; 382/1, 8

[56] References Cited

U.S. PATENT DOCUMENTS

| | | | |
|---|---|---|---|
| 2,318,856 | 5/1943 | Hoffman | 209/538 |
| 2,422,036 | 6/1947 | Oakley | 209/555 |
| 2,771,992 | 11/1956 | Artingstall et al. | 209/919 X |
| 3,546,377 | 12/1970 | Troll | 358/106 |
| 3,712,466 | 1/1973 | Aubry | 209/538 |
| 4,072,928 | 2/1978 | Wilder | 382/8 |
| 4,117,539 | 9/1978 | Bell et al. | 356/426 X |
| 4,589,554 | 5/1986 | Edelbruck et al. | 209/546 |
| 4,596,331 | 6/1986 | Edelbruck et al. | 209/546 |

FOREIGN PATENT DOCUMENTS

| | | | |
|---|---|---|---|
| 2595590 | 9/1987 | France | 209/587 |

OTHER PUBLICATIONS

"*Automatic Cartridge Case Inspection and Process Control Monitor*", W. J. Coleman and K. L. Swinth, SPIE vol. 122, Advances in Laser Engineering (1977), pp. 74–87.

"Noncontact Inspection", Photonics Spectray, Apr. 1987, p. 42.

"Metal Surface Inspection Using Image Processing Techniques", Hon-Son Don, King-Sun Fu, Wei-Chung Lin; Transactions on Systems, Man and Cybernetics, vol. SMC-14, No. 1, Jan./Feb. 1984.

*Primary Examiner*—Johnny D. Cherry
*Assistant Examiner*—Edward M. Wacyra
*Attorney, Agent, or Firm*—Finnegan, Henderson, Farabow, Garrett & Dunner

[57] ABSTRACT

An automatic visual inspection system for small arms ammunition which sorts visual surface flaws at high speed according to established standards which can be tailored to fit specific needs. The system employs advanced techniques for performing inspection independently of human inspectors and allows for quick changeovers in the type of ammunition to which it is applied. The system comprises interface apparatus for receiving a supply of ammunition cartridges and providing each cartridge with a predetermined orientation, conveying apparatus for locating each of the cartridges for inspection in at least one inspection station, apparatus for imaging selected areas of each cartridge to provide video surface feature data associated therewith, and apparatus for processing the video surface feature data to detect the presence of a predetermined set of characteristics and provide output signals in accordance therewith, the conveying apparatus being operated to sort each of the inspected cartridges in accordance with the output signals. A preferred embodiment comprises four subsystems, a feeding subsystem, an imaging and handling subsystem, an operation subsystem, and a computers subsystem. The imaging and handling subsystem provides each cartridge with the necessary orientation for inspection by a video camera feeding video surface feature data to an image processing computer. The image processing computer makes a very high speed computation based on image processing techniques to decide whether the cartridges have manufacturing defects for sorting purposes. Since many surface flaws look the same in two dimensions such as scratches and splits or acid holes and stains, special lighting of the cartridges is used so that discrimination between them can be achieved on the basis of off-specular reflections.

23 Claims, 21 Drawing Sheets

SH. 1 OF 3

SH. 2 OF 3

SH. 3 OF 3

SMALL ARMS AMMUNITION INSPECTION SYSTEM

FIELD OF THE INVENTION

The present invention relates to automation systems for inspection and sorting of small arms ammunition cartridges, cartridge cases and bullets using image processing techniques to classify visual defects resulting in the manufacturing process.

BACKGROUND OF THE INVENTION

Inspection of surface defects on small arms ammunition cartridges is a vital aspect in the manufacturing process, allowing for maintenance of a high level of quality and reliability in the munitions industry. Standards have been developed and applied by manufacturing for many years to assist in classifying various types of defects. Alternatively, a military standard is used such as that introduced in 1957 by the US Department of Defense, MIL-STD-636. For small arms ammunition calibers up to 0.50, this standard severs to evaluate and illustrate a practical majority of defects assembled as a result of extensive surveys covering all the small arms ammunition manufacturing facilities in the US.

Currently, inspection of small arms ammunition cartridges in accordance with this or any other standard is left to human inspection by which individual inspectors are each assigned the task of visually inspecting the cartridges for surface defects at a rate of about 60–70 units per minute. Each of these inspectors is trained to look for all defects and sort these into collection bins, all done manually. There are obvious disadvantages which increase inspection errors, including inspector fatigue, inexperience, lack of uniformity in the application of inspection standards, eyesight problems, inconsistency, and a slow rate of output. A result of this approach is the possibility of over or under inspection which increases inspection costs. Also, the labor cost problem is also a very real one as the tedious inspection work must be done economically so that low wages are common, yet the standards applied by the inspectors must not be jeopardized.

It would therefore be desirable to improve the inspection process for small arms ammunition cartridges so as to eliminate the errors associated with human visual inspection and decrease the costs associated with inspection.

SUMMARY OF THE INVENTION

Accordingly, it is a principal object of the present invention to overcome the above disadvantages and provide an automatic visual inspection system for small arms ammunition which sorts visual surface flaws at high speed according to established standards which can be tailored to fit specific needs. The system employs advanced techniques for performing inspection independently of human inspectors and allows for quick changeovers in the type of ammunition to which it is applied.

In accordance with a preferred embodiment of the invention, there is provided a small arms ammunition inspection system for cartridges, cases, bullets and the like, the system comprising:

interface apparatus for receiving a supply of ammunition cartridges and providing each cartridge with a predetermined orientation;

conveying apparatus for locating each of the cartridges for inspection in at least one imaging station;

apparatus for imaging surface areas of each cartridge in the imaging station to provide video surface feature data associated therewith; and apparatus for processing the video surface feature data to detect the presence of a predetermined set of characteristics and provide output signals in accordance therewith, the conveying apparatus being operated to sort each of the inspected cartridges in accordance with the output signals.

In the preferred embodiment, the ammunition inspection system comprises four subsystems, a feeding subsystem, an imaging and handling subsystem, an operation subsystems, and a computers subsystem. The feeding subsystem is nor part of the inventive system. The imaging and handling subsystem includes interface apparatus which employs a magazine and solenoid-activated shutter to connect the feeding subsystem into the inspection system, so as to give the cartridges the required orientation and insure continuous feeding of cartridges. The imaging and handling subsystem takes the cartridges from the interface apparatus and places them in individual slots of a circular slotted handling plate which is arranged for indexed rotation through a number of feeding, imaging and ejection stations.

A feature of the invention is the provision of position-driven asynchronous control of system functions with respect to the indexed rotation of the handling plate.

The operation subsystem includes an operator console for controlling day-by-day system operation. The computers subsystem includes a control and operation computer for providing integrated system control and statistical computation associated with the manufacturing flaws which are detected.

Also in the computers subsystems, an image processing computer gathers surface feature data in the form of video signals provided by the imaging and handling subsystem in one or several imaging stations in the indexed rotation. Since many surface flaws look the same in two dimension, such as scratches and splits or acid holes and stains, special lighting based on off-specular reflections from the cartridges is used so that discrimination between them can be achieved.

The image processing computer receives the video signals and makes a very high speed computation based on image processing techniques to decide whether the cartridges have manufacturing defects and through which of the indexed ejection stations they will be ejected from the handling plate for sorting purposes.

Also in the preferred embodiment, the first imaging station carries out a procedure in which the cartridge is held stationary and the cartridge head is inspected by an area CCD video camera. The image gathered is used to detect the presence of a complete water-proofing varnish ring around the primer cap and structural defects in the primer area. Where mouth anneal is to be checked for rifle cartridges, this inspection is carried out in the first imaging station.

In the second imaging station, the cartridge is dynamically rotated and the image is gathered by two CCD line video cameras which are fixed in position. One of these cameras provides surface feature video signals from the cartridge head, and the other from the side. As the cartridge head rotates in front of the first camera, a narrow image line of the rotating surface area is transformed into video signals which are provided in a rectangular standard video format. The second camera gathers side feature video signals as the cartridge is rotated and provides a "peeled" image, also in a standard video format. Application of image processing to these signals enables the system to detect the presence of any surface flaws.

The video signals are processed by the image processing computer in accordance with algorithms which use low level and high level computations. The low level computation is a two-dimensional one for major data reduction and the high level computation is performed by a 32-bit computer which decides what to do with the results of the low level computation, that is, how the cartridges are to be sorted.

A feature of the invention is that the imaging and handling subsystem can receive cartridges continuously from several feeders or production lines and perform inspection at a rate of up to 300 cartridges per minute.

Another feature of the invention is the short time for changeover from one type of cartridge inspection to another based on a minimal amount of component replacements and minor software changes in the image processing computer.

Still another feature of the invention is the ability to operate the system in one of several operating modes. One such mode is an automatic control mode in which the system normally operates. In a set-up control mode, the operator can change the discrimination level between different defects. The operator can call for a past set-up discrimination level which has been stored in a library of the control and operation computer. In a maintenance control mode, the operator can operate individual units for purposes of assisting maintenance help. In a statistics control mode, the operator can call for different statistical analyses to be performed by the control and operation computer.

In another embodiment, an operating mode is provided in which rejected cartridges are distinguished with respect to the originating production line from which they are fed.

Other features and advantages of the invention will become apparent from the drawings and the description contained hereinbelow.

BRIEF DESCRIPTION OF THE DRAWINGS

For a better understanding of the invention with regard to the preferred embodiments, reference is made to the accompanying drawings in which like numerals designate corresponding elements throughout, and in which.

DETAILED DESCRIPTION OF A PREFERRED EMBODIMENT

Figure 1:
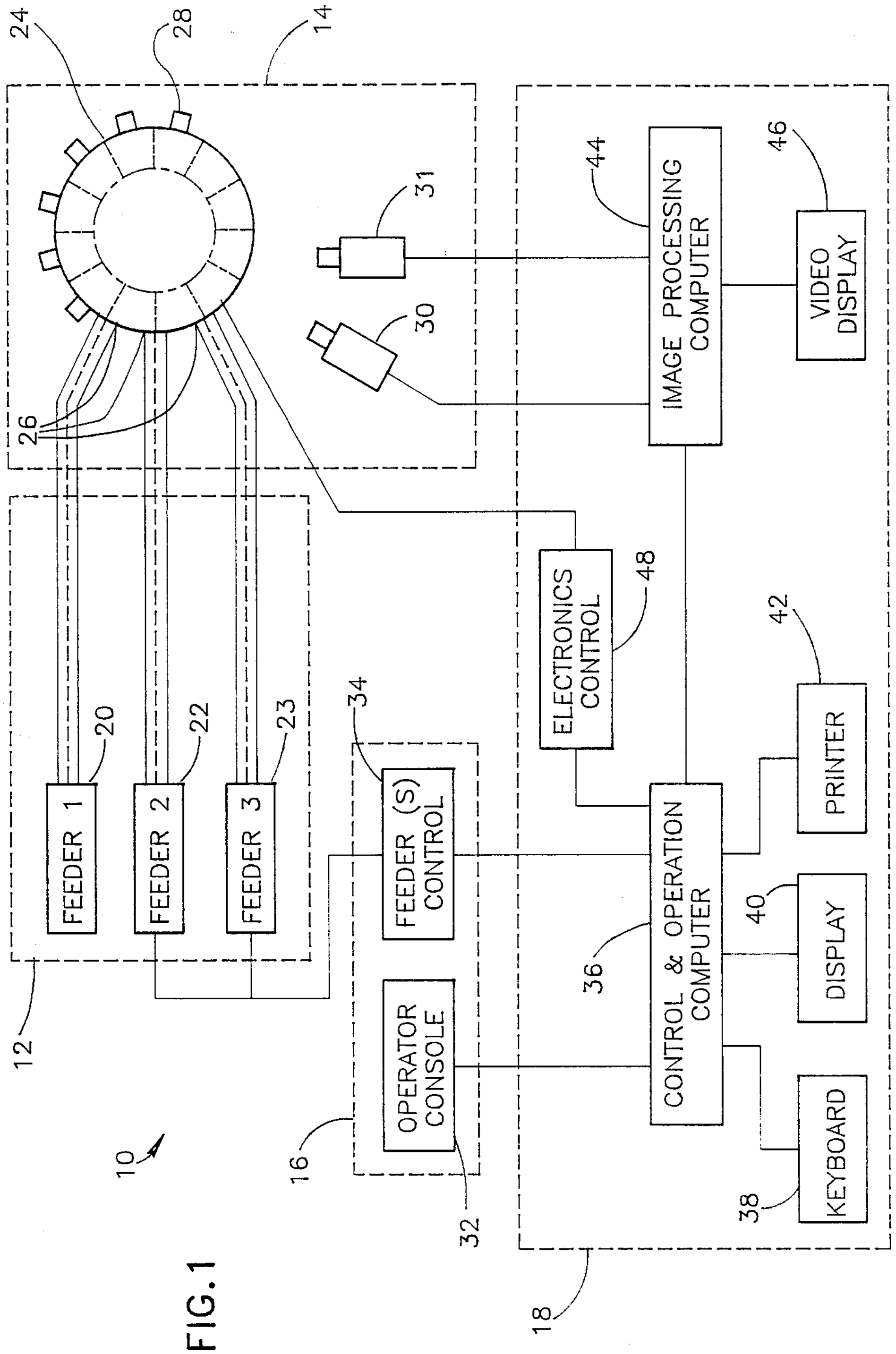
FIG. 1 is an overall system block diagram of a small arms ammunition inspection system in accordance with the present invention.

Referring now to FIG. 1, there is shown a system block diagram of a small arms ammunition inspection system 10 furnished in accordance with a preferred embodiment of the present invention. The system 10 comprises an integrated set of subsystems including feeding subsystem 12, an imaging and handling subsystem 14, an operation subsystem, 16 and a computers subsystem 18. Each of the subsystems is housed in an assembly featuring the application of durable design and construction methods as shown and described further herein.

Feeding subsystem 12 includes one or more commercially available bowl and linear feeders 20, 22 and 23 which are arranged to feed ammunition cartridges from respective production lines 1–3 for inspection by imaging and handling subsystem 14. The cartridges are fed to imaging and handling subsystem 14 and are received therein by a circular slotted handling plate 24 arranged for indexed rotation with respect to feeding magazines 26 and a plurality of ejection ports 28 (shown typically). Two imaging stages 30 and 31 comprising video cameras used in static (singe camera) and dynamic (dual camera) imaging procedures are provided in proximity to handling plate 24. Imaging stages 30 and 31 extract surface features of the cartridges in the form of video signals which are fed to the computers subsystem 18 for image processing as described herein.

Operation subsystem 16 contains an operator console 32, feeders control unit 34. Operator console 32 contains various system controls as detailed further herein (FIG. 5) and feeder control unit 34 supplies electrical power and control of feeding subsystem 12.

Overall control of the functions of each of subsystems 12, 14 and 16 is provided via computers subsystem 18 through a control and operation computer 36 which has associated keyboard 38, display monitor 40 and printer 42 devices. Computers subsystem 18 includes an image processing computer 44 which receives video data from imaging stages 30 and 31 in accordance with the operation of imaging and handling subsystem 14. Electronics control unit 48 supplies control signals to handling plate 24 to provide position-drive asynchronous control with respect to its rotation.

Feeding subsystem 12 is not part of the invention and is typically customer furnished in accordance with specifications which include interface requirements for the cartridge feed rate from each of feeders 20, 22 and 23 to be between 120–180 cartridges/min. depending on cartridge size. In addition, the feeding subsystem 12 must provide the cartridges in a horizontal plane at the height of feeding magazine 26, with a radial orientation with respect to handling plate 24 such that the cartridge bullet is directed toward the center thereof.

Figure 2:
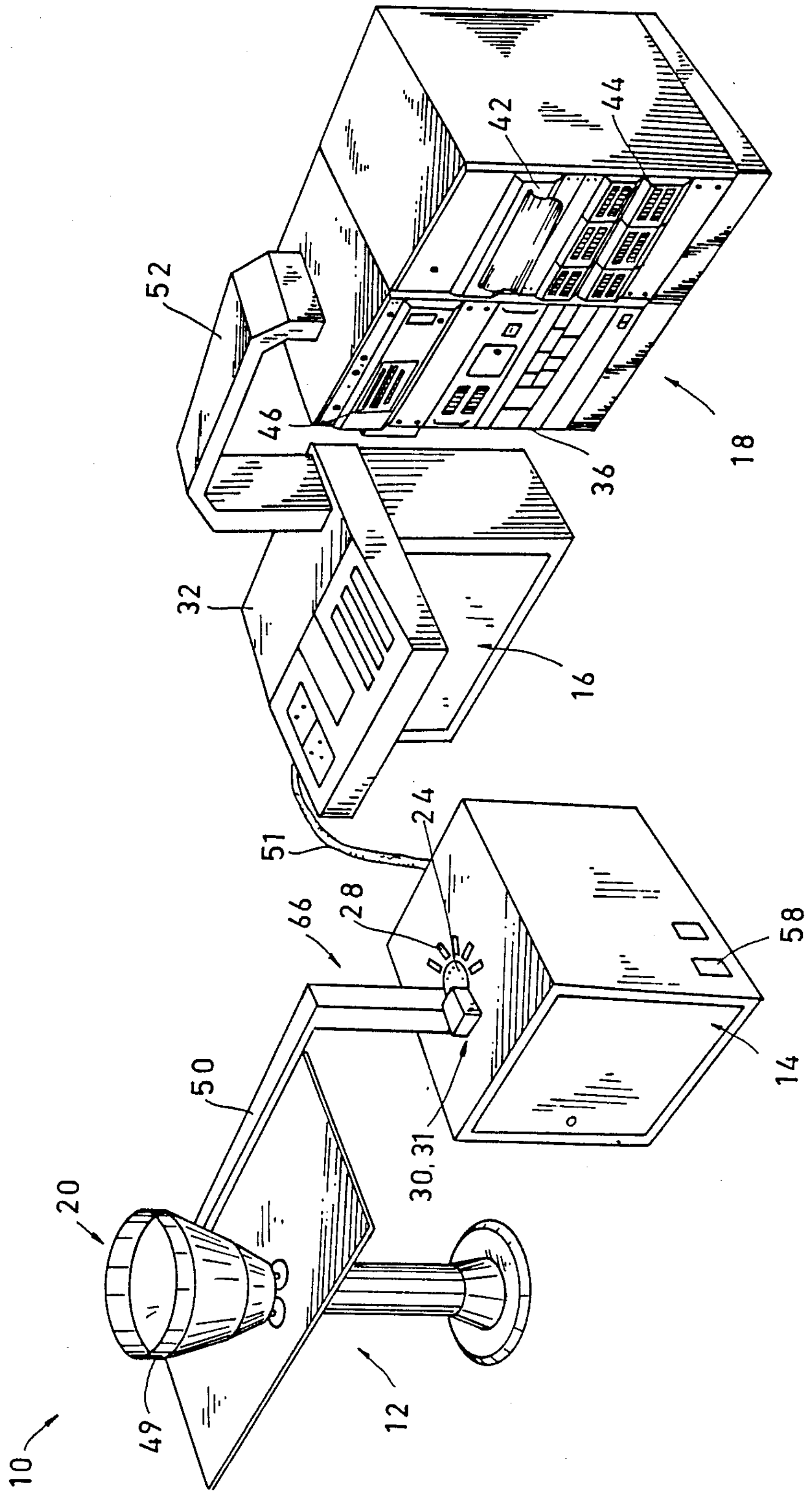
FIG. 2 is an overall isometric view of the system of FIG. 1 showing a feeding subsystem in a single feeder arrangement, an imaging and handling subsystem, an operation subsystem, and a computers subsystem.

Referring now to FIG. 2, there is shown an overall isometric view of the system of FIG. 1 showing feeding subsystem 12 as a single feeder 20 arrangement, together with imaging and handling subsystem 14, operation subsystem 16 and computers subsystem 18. Feeder 20 comprises bowl and linear feeder 49 and 50 which feeds ammunition cartridges through feeding interface magazine 26 (FIGS. *4a–c*) to imaging and handling subsystem 14 such that each cartridge is transferred to a slot in circular slotted handling plate 24. Handling plate 24 may have a plurality of slots and is designed to be replaceable in modular fashion to allow for easy adjustment between various cartridge sizes to be inspected.

Handling plate 24 is arranged for indexed rotation between several stations and provides the rotational handling motion of the cartridges between interface magazine 26, the imaging stages 30 and 31, and the ejection ports 28. In the preferred embodiment, three of the indexed stations are provided for feeding cartridges, although only one is shown in FIG. 2. Two imaging stations are provided for cartridge inspection wherein video data is gathered by imaging stages 30 and 31 in accordance with techniques described further herein. An additional to intermediate stations are provided, after which there are a plurality of stations (shown typically) providing ejection ports 28. Suitable bins or conveyors (not shown) are provided for collecting the ejected cartridges.

Operator console 32 provides an operator with the ability to control proper operation of the system via respective control and signal wiring cable 51 and cable tray 52.

Two computers are provided in computers subsystem 18, a control and operation computer 36 and an image processing computer 44. The first of these controls the system operation and computes statistics associated with the flaws detected in the cartridge imaging stations. It also provides the opportunity to change parameters which determine the threshold levels of discrimination between different flaws, all in accordance with the cartridge manufacturer's requirements. The image processing computer 44 provides a high speed computation based on the video data it receives from imaging stages 30 and 31, and makes a decision through which of ejection ports 28 the inspected cartridge is to be ejected.

Referring now to FIGS. *3a–c*, there is shown in FIG. *3a* a plan view from above imaging and handling subsystem 14 illustrating additional construction details. Feeding subsystem 12 is shown mounted on a table 53 enclosed by a frame 54, and is arranged for three feeders, using interface magazines 26 as in FIG. 1. Circular slotted handling plate 24 is arranged for indexed rotation in the direction shown, a complete rotation including feeding stations corresponding to magazines 26, a video camera 55 associated with a static imaging stage 30, a dynamic imaging stage 31, and ejection stations corresponding to ejection ports 28.

Before insertion into a dedicated slot 57 of handling plate 24, a new cartridges which are to be inspected pass through interface magazines 26, controlled by a solenoid-activated shutter (not shown). The shutters in the three interface magazines 26 are coordinated to permit automatic insertion of cartridges vertically from a given magazine into a slot 57 (shown typically) when indexed rotation of handling plate 24 places it under a feeding magazine 26 in a feeding station.

Figure 3A:
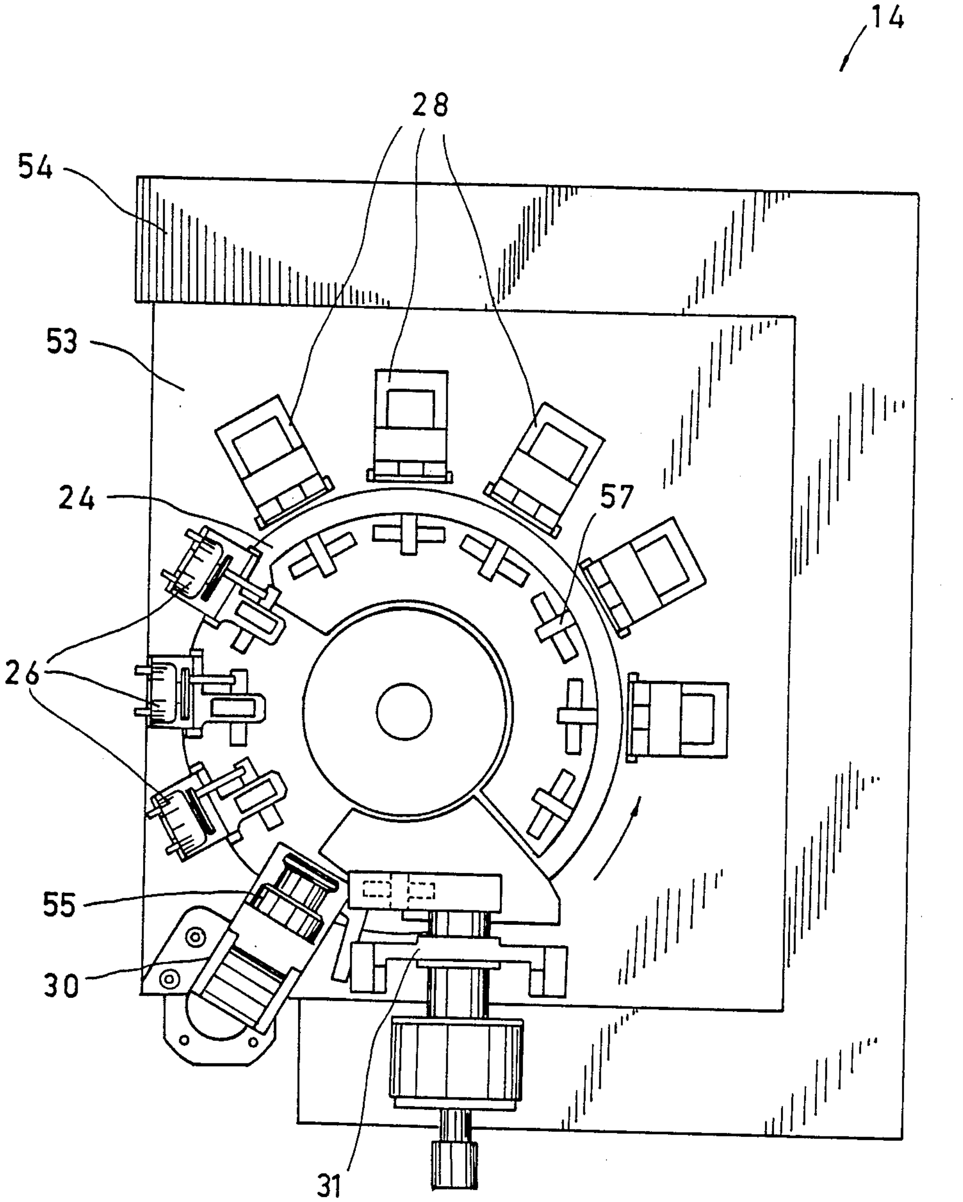
FIGS. 3*a–c* are respective plan, elevation, and side views of the imaging and handling subsystem of FIG. 2.
Figure 3B:
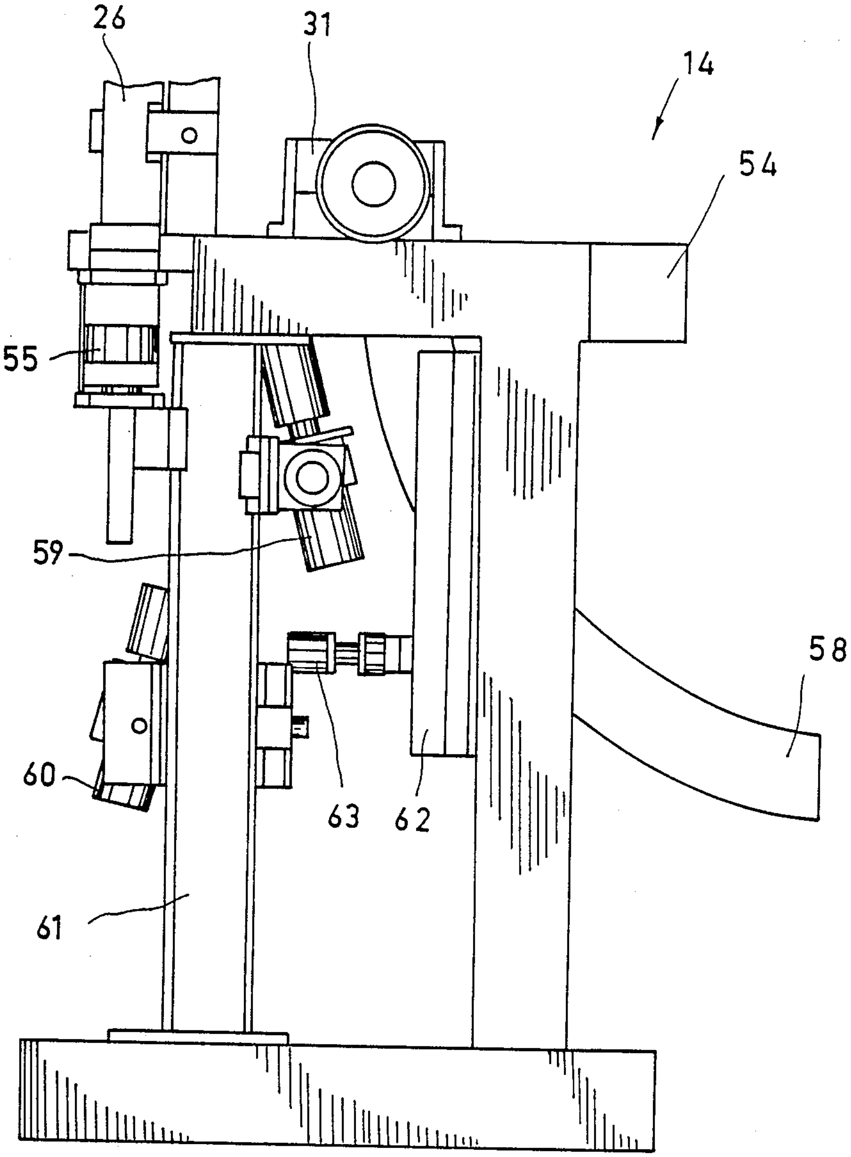
Figure 3C:
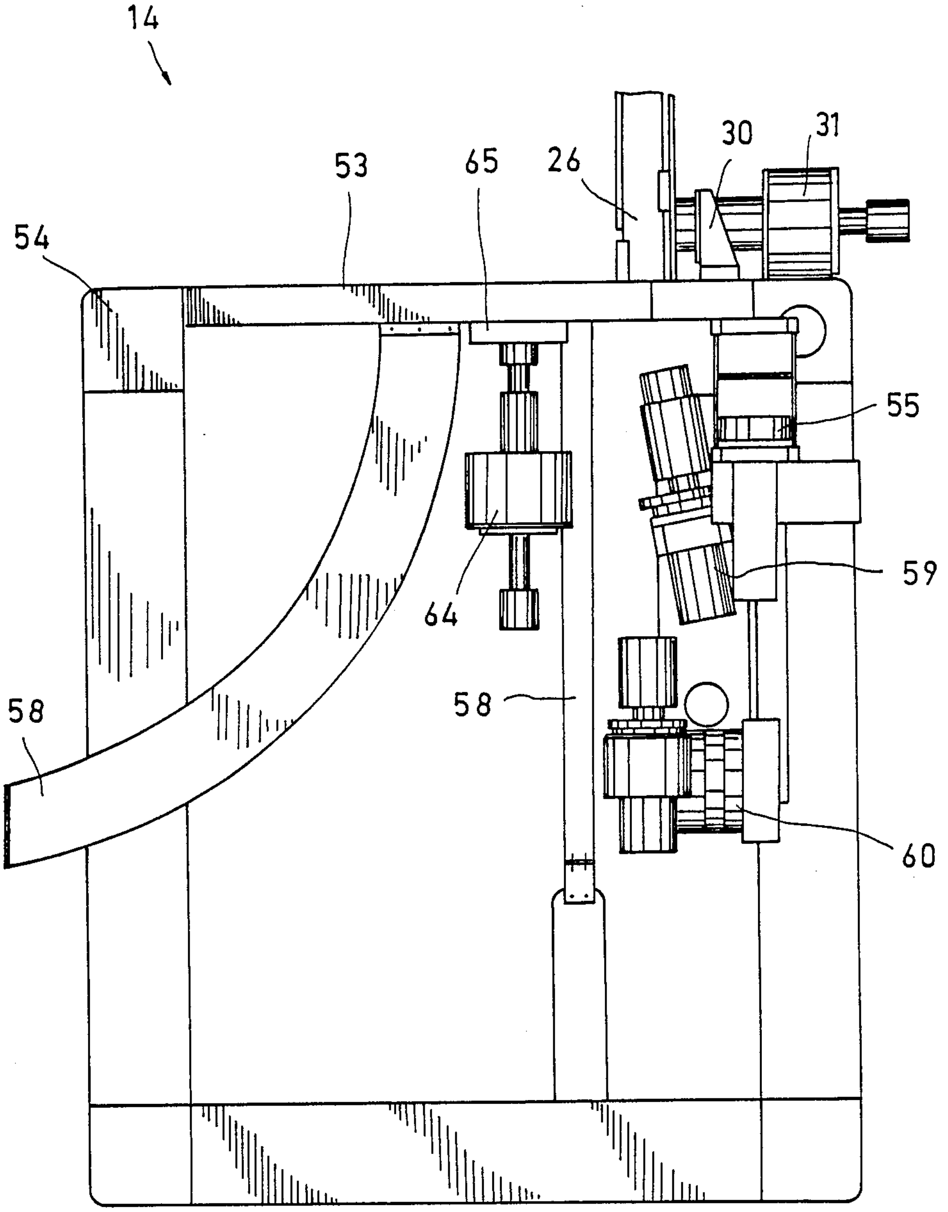

FIG. 3b shows an elevation of subsystem 14 viewed from the dynamic imaging stage 31 end, featuring ejection chutes 58 corresponding to ejection ports 28. Also shown are a pair of video cameras 59 and 60 supported by an optical bench 61 and associated with dynamic imaging stage 31. An illumination source 62 and associated spectral filter motor 63 are also supported by bench 61. FIG. *3c* shows a side view of subsystem 14 viewed from the magazines 26 end, showing a motor 64 and transmission assembly 65 for driving the handling plate 24 rotation.

Referring again to FIG. *3a*, ejection ports 28 can be established according to a desired classification of inspected cartridges. In this way, one ejection port 28 can be for the inspected cartridges which have been determined to be permissible, another port 28 for defects which can be reworked, still another port 28 for minor defects where the cartridges are usable, and still another port 28 for completely rejected cartridges.

In another embodiment, an operating mode is provided in which rejected cartridges are distinguished with respect to the originating production line from which they are fed to subsystem 14 by feeders 20, 22 and 23.

In accordance with the present invention, the technique for insertion of cartridges into the slots 57 involves provision of interface magazine 26 with optical sensors to supply min-max level control via status signals to the control and operation computer 36 for proper control of the shutters. In this instance, the feeders 20, 22 and 23 provide the cartridges continuously at the proper rate in order to avoid lack of a cartridge in a given feeder whenever an empty slot 57 in handling plate 24 presents itself under the shutter. A control signal signifying full/empty status of the slot 57 is provided to the control and operation computer 36 to synchronize the opening of the shutters.

In FIG. *4a*, there is shown a side view of interface magazine 26 looking in the direction of arrow 66 of FIG. 2. The interface magazine 26 comprises an enclosure 67 vertically oriented with respect to handling plate 24, thus providing each cartridge 68 (shown typically) with a horizontal alignment against a backplate 69. Enclosure 67 consists of a sandwich of two plates 70, 71 (FIG. *4b*) which allow for an adjustable width to accommodate various size cartridges. Optical sensor 72 and 73 are mounted on one side of enclosure 67 and are optically aligned across an opening 74 with counterpart sensors 75 and 76 which are mounted on the other side of enclosure 67. Also visible are a solenoid 77 and shutter 78 combination which control the feeding of cartridges into slot 57 of plate 24.

Figure 4A:
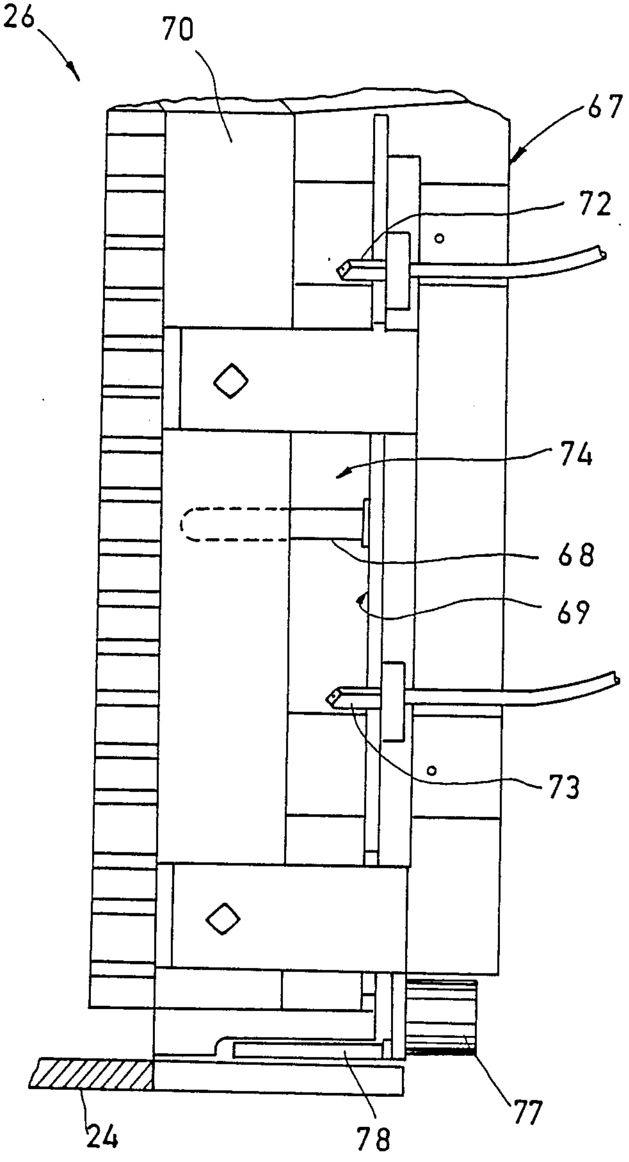
FIGS. 4*a–c* are detailed views of an interface magazine portion between the feeding subsystem and imaging and handling subsystem of FIG. 2.
Figure 4B:
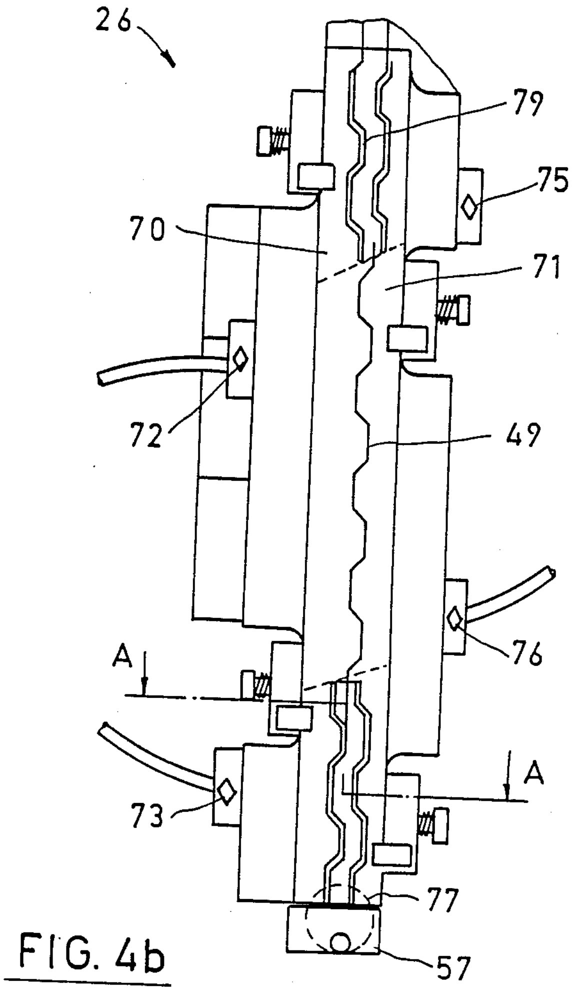
Figure 4C:
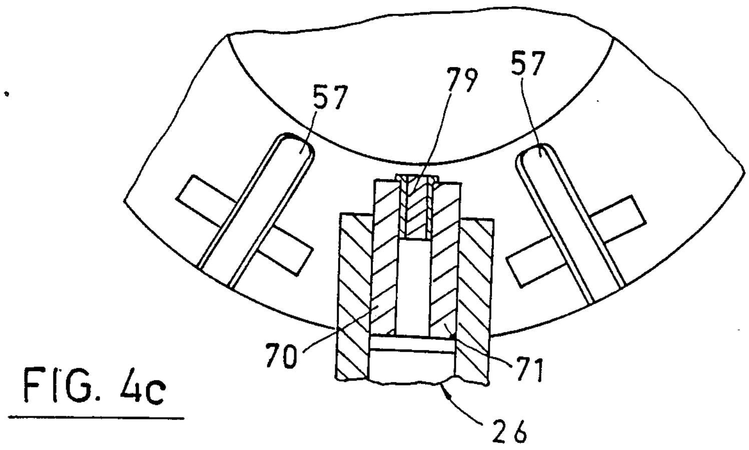

FIG. 4b shows a view of the magazine face looking toward the center of handling plate 24. A zig-zag construction of the inner slidably adjustable walls 79 of plates 70, 71 is illustrated, which serves to reduce the potential energy with which each cartridge 68 is inserted into slot 57 of handling plate 24 along path 49. FIG. 4c shows a cross-sectional view of magazine 26 taken along section lines A—A of FIG. 4b and looking down on handling plate 24, such that slots 57 therein are visible.

Figure 5:
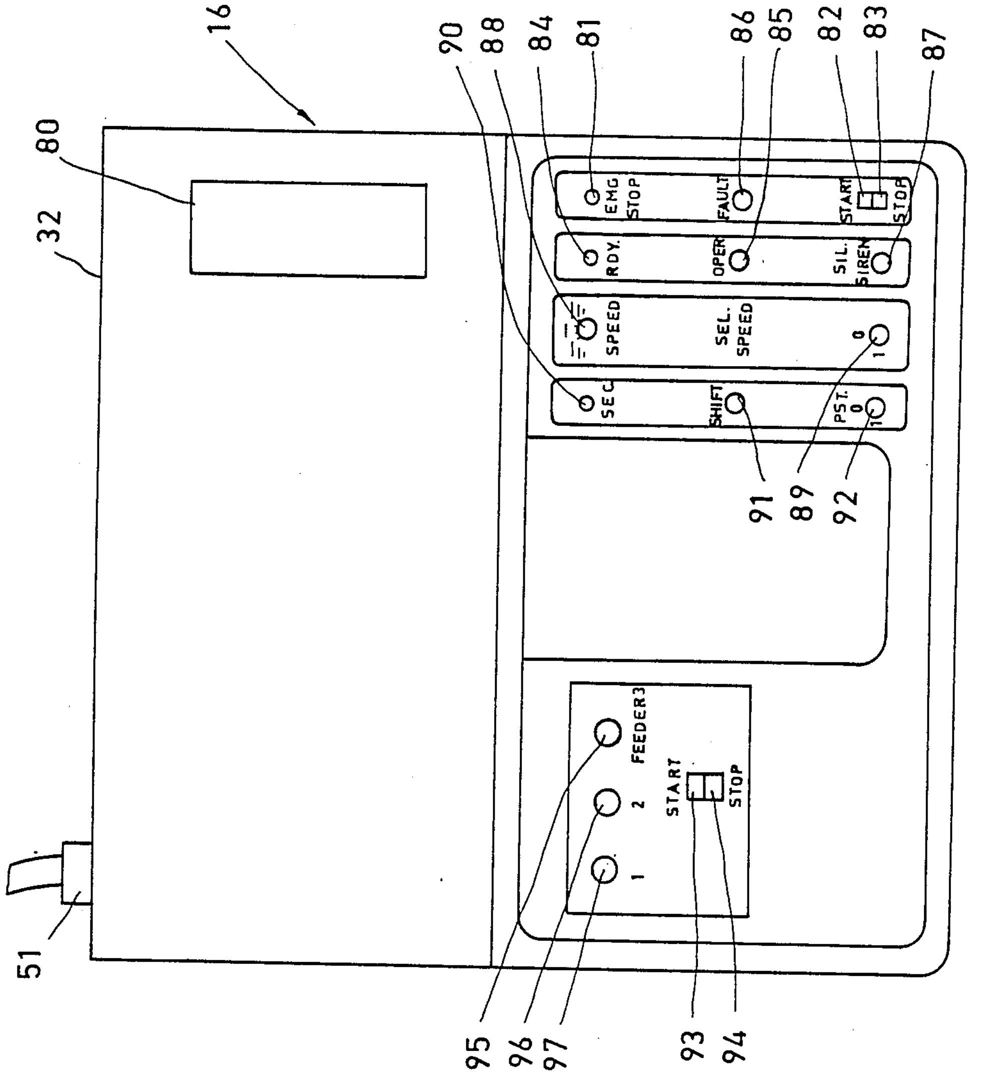
FIG. 5 is a top view of the operation subsystem of FIG. 2 showing the operator's console.

Referring now to FIG. 5, there is shown a top view of the operation subsystem 16 of FIG. 2 showing the operator console 32. This subsystem 16 contains the electrical interconnections and supplies power and control signals to the feeding subsystem 12 and the imaging and handling subsystem 14 via cable 51. In addition, special electronic circuits and controls for the feeding subsystem 12 can be integrated if required. Connections to the computer subsystem 18 are handled by cable tray 52 which is joined at the opening 80 in the operator's console 32.

Operator console 32 comprises control pushbuttons, a rotary switch and indicator lights providing an operator with easy access to day-to-day system control functions and system status information. An emergency stop button 81 provides an immediate halt to system operation under emergency conditions, while the system start and stop button 82 and 83 are used for normal control. A ready indicator light 84 indicates the system is ready for normal operation, and operation indicator light 85 indicates operation is underway after start button 82 is depressed. Malfunction indicator light 86 flashes when problems occur, and pushbutton 87 defeats the audible alarm under such conditions.

An inspection rate selection switch 88 allows operator selection of rate at which cartridges are inspected, and lock switch 89 allows locking of the rate selection by a removable key so that changes in the position of rate selection switch 88 have no effect. A section pushbutton 90 resets counts of the control and operation computer 36 to zero cases when inspection of a new batch of cases has begun. It is also possible to reset the counts for a new inspection shift via a shift pushbutton 91. The settings of both section and shift pushbuttons 90 and 91 can be locked by a removable key after resets have been done by use of lock switch 92. Feeding subsystem 12 is controlled from operator console 32 by way of feeder start and stop pushbuttons 93 and 94 as indicated by indication lights 95, 96 and 97.

Figure 6:
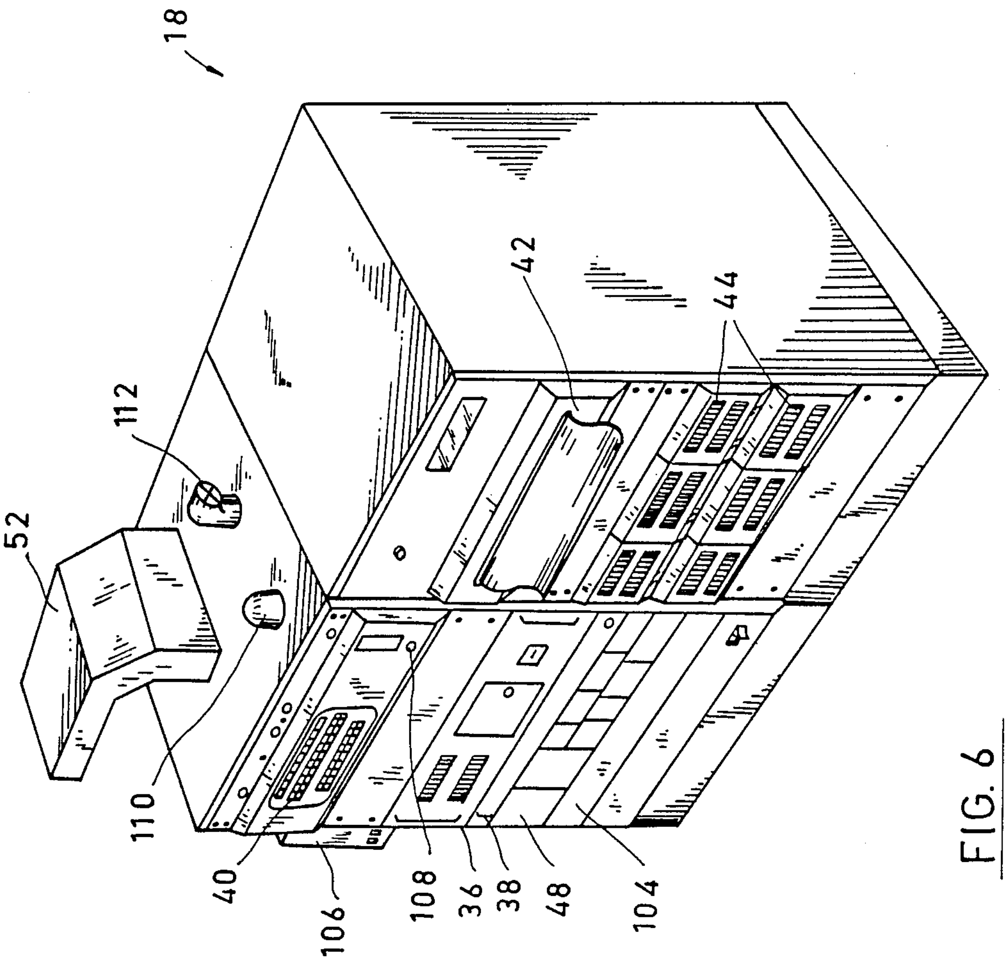
FIG. 6 is an isometric overall view of the computers subsystem of FIG. 2.

FIG. 6 is an isometric overall view of the computers subsystem 18 of FIG. 2, and comprises the control and operation computer 36 and the image processing computer 44. In addition, computer subsystem 18 comprises electronic control unit 48, power supplies 104, electrical mains box 106, master system reset pushbutton 108, rotating alarm light 110 and siren 112.

In the preferred embodiment, control and operation computer 36 comprises a computer such as the PC/AT type manufactured and marketed by the IBM Corporation, supplied with the necessary electronic interfaces, keyboard drawer 38, color display monitor 40, an 80 cps printer 42. User-friendly software is provided to allow the operator to control several tasks, each represented to him by an appropriate "screen format".

The control functions performed by the control and operation computer 36 include controlling the feeding subsystem 12 and the imaging and handling subsystem 14 via electronics control unit 48 to provide position-driven asynchronous control with respect to handling plate 24 rotation. System on-line and off-line diagnostics of all functions are provided to insure fail-safe operation. When failures are detected in the system operation, alarm signals are activated via alarm light 110 and siren 112, with the type of failure being displayed on the screen of display monitor 40. Such failures include the areas of feeding, imaging, handling, ejection, improper inspection, and improper communication between the control and operation and image processing computers 36 and 44. Reset pushbutton 108 resets the system at its starting point.

The improper inspection failure is monitored by a statistical process control program. This program monitors two parameters for a given cartridge: (1) the stability of each imaging procedure decision and (2) absence of a trend in the error function. These parameters are monitored over a history of 100 successive cartridges, for example, and local behavior is detected within the last 10 samples, for example. If in these 10 samples there is noticed a trend or change of probability, the system recognizes either it is operating defectively with respect to the classification of flaws, or there is a continuous defect in the production line.

The control and operation computer 36 also computes inspection statistics which are displayed in real-time and printed in quasi-real time, such as after every batch of cartridges or after every inspection shift. By use of the screen formats provided to the operator, the control and operation computer 36 provides a menu-driven system which gives the necessary instructions to each of the other inspection subsystems 12, 14 and 16. Print-outs are available from printer 42 such as log files of inspection statistics and failure or data associated with other "screen formats". Maintenance help is also provided by allowing test operations of major portions of each subsystem, such as feeders 20, 22 and 23, handling plate 24 imaging stage 30, ejection ports 28, operator console 32, and the like.

As described further herein with regard to FIGS. 8–20, image processing computer 44 performs image processing of the video signals sent from imaging stages 30 and 31 in the imaging and handling subsystem 14, and based on this decides through which of ejection ports 28 the inspected cartridge is to be ejected. Electronics control unit 48 contains the electronics that operate the various servomechanisms in the system. Power supplies 104 provide the necessary voltage supplies for the computers subsystem 18 based on an electrical supply from electrical mains box 106.

The operating concept for the inspection system requires a non-skilled operator to control the system operation from the operator's console 32, examine the display monitor 40 in the computers subsystem 18 to assure proper system operation, collect print-out data from printer 42, and solve very simple operational problems, using the system reset pushbutton 108 where necessary. Supervisory and technical personnel provide assistance when needed and also provide maintenance for the operation and control computer 36.

The inspection system according to the present invention has several operating modes in addition to the ones described earlier. These include an automatic control mode used during normal system operation as provided by operation and control computer 36, in conjunction with the operator console 32. The set-up control mode allows the supervisory personnel to make changes in system operation by adjusting the discrimination levels of the different defects associated with cartridge inspection. A past set-up mode can be recalled from the memory of control and operation computer 36. A maintenance control mode allows supervisory or technical personnel to operate individual units in an effort to isolate problems. A statistics control mode allows for different types of statistical analyses to be performed using the data gathered from inspection operations.

Figure 7:
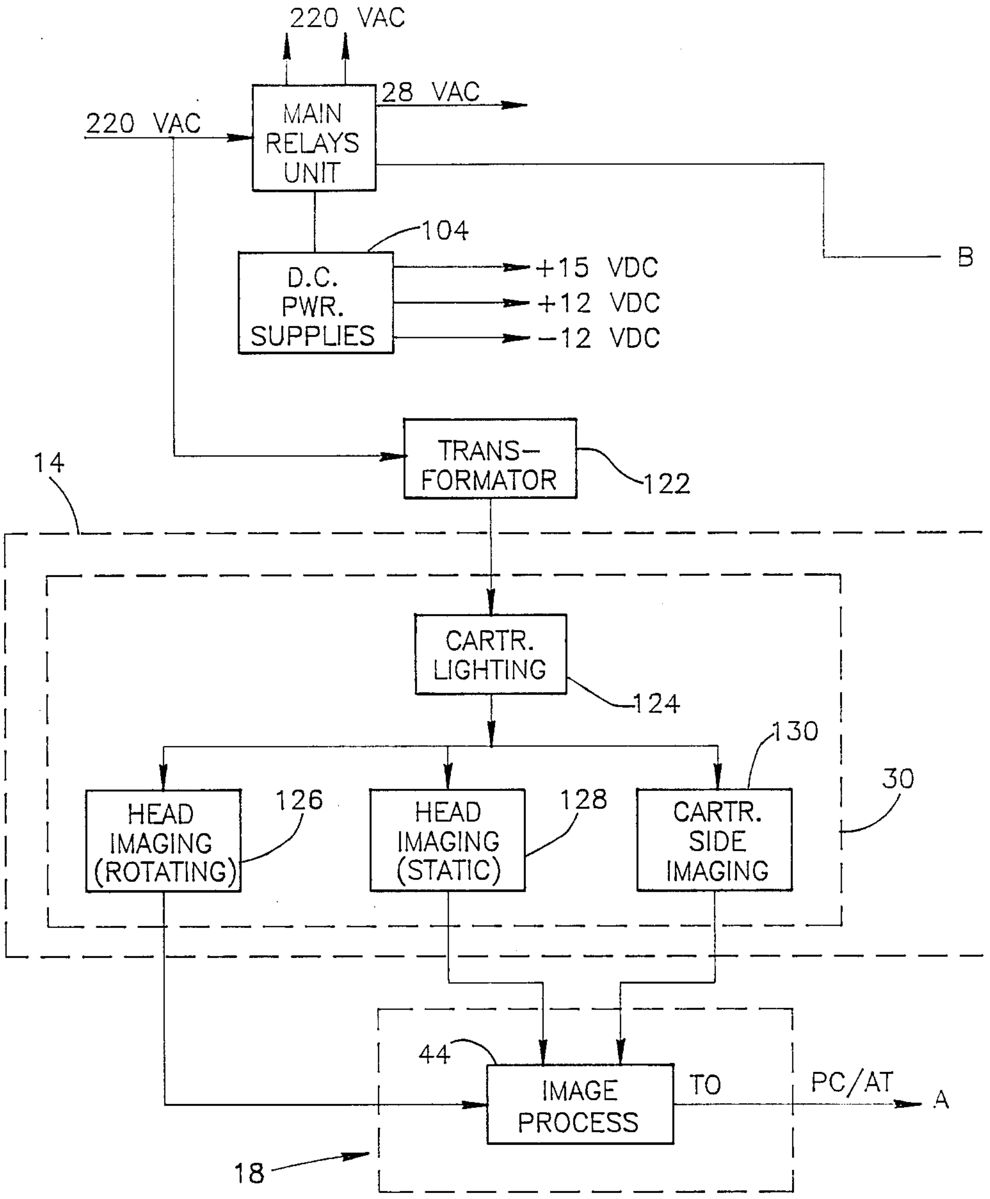
FIG. 7 is a functional block diagram of the inventive ammunition inspection system operation showing integration of the control functions associated with the subsystems of FIGS. 1–6.
Figure 7:
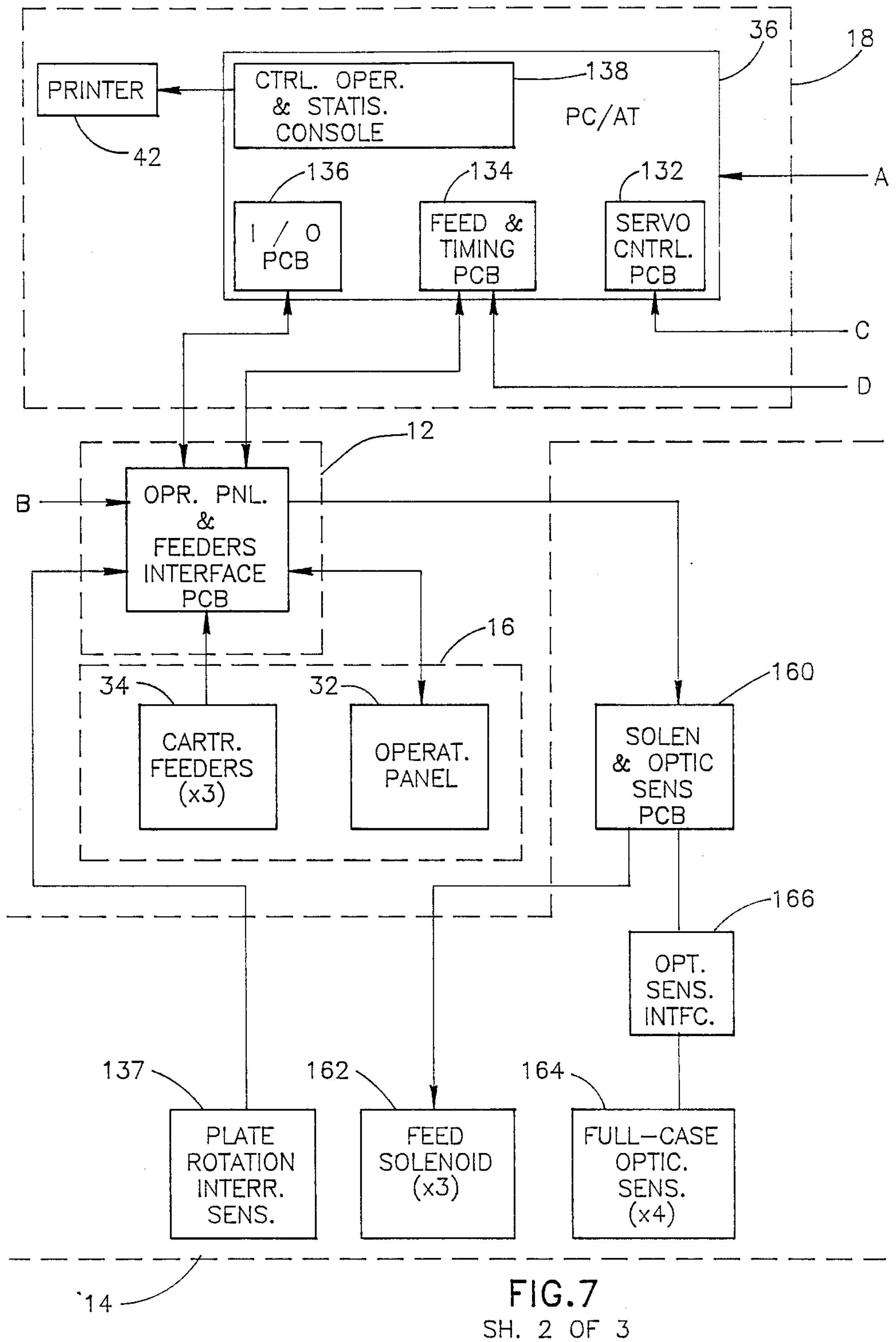
Figure 7:
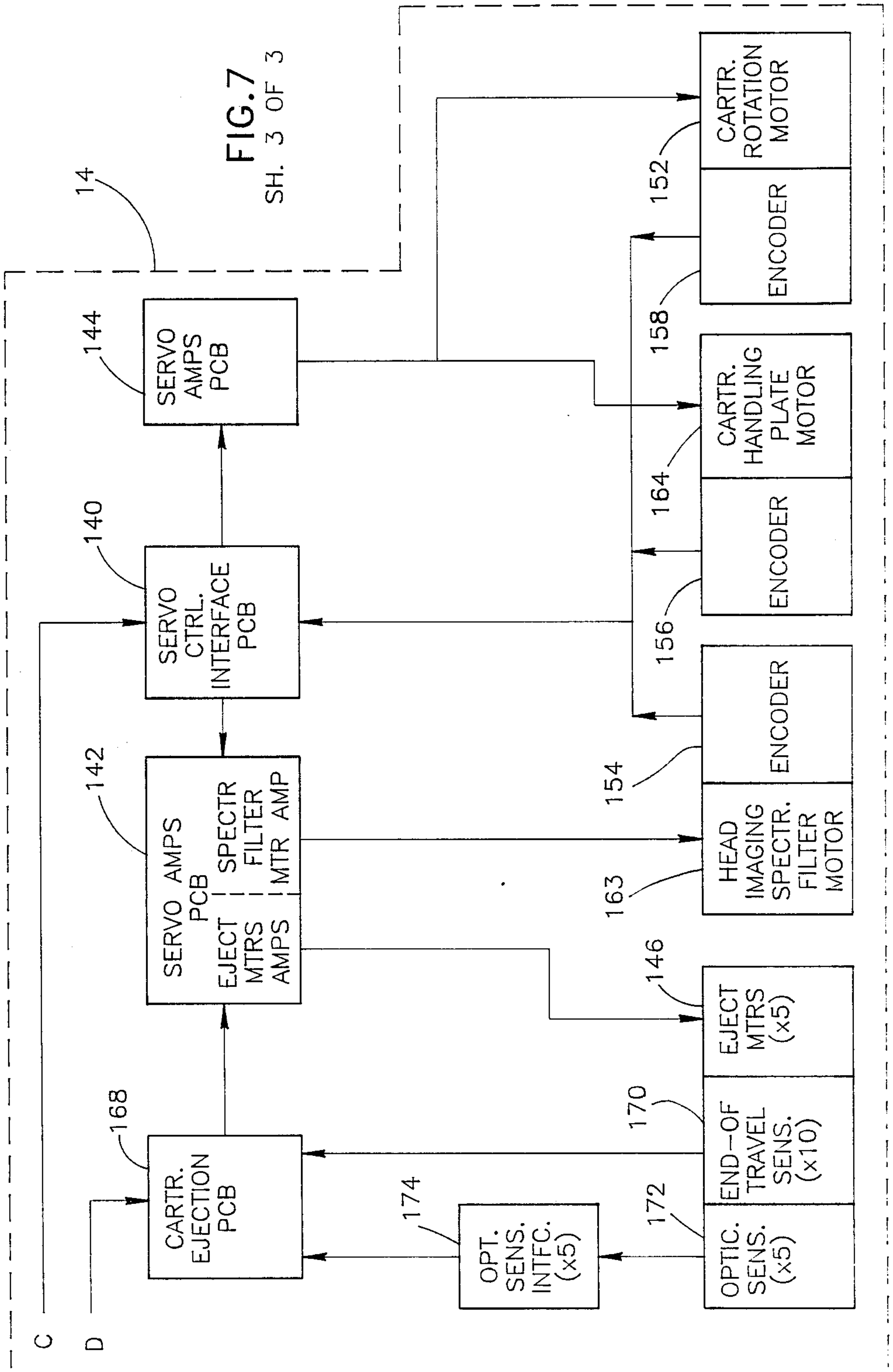

Referring now to FIG. 7, the inventive ammunition inspection system is illustrated as a functional block diagram which integrates the control functions associated with the subsystems 12, 14, 16 and 18 of FIGS. 1–6. The diagram contains several blocks including printed circuit boards (PCB), servomechanisms, encoders, power supplies, and interface units which are now briefly described.

Electrical mains block 106 receives input power shown typically as a 220 VAC supply, from which 28 VAC is taken for operator console 32, and which provides power to DC power supplies block 104, transformer block 122, and other subsystems. Transformer block 122 provides power to cartridge lighting block 124 which is used in imaging stages 30 and 31 to illuminate the cartridges being inspected under control of imaging and handling subsystem 14. Two head imaging blocks 126 and 128 provide static and rotating (dynamic) inspection, in association with video cameras 55 and 59 and as described further herein. Cartridges side imaging block 130 performs the same function on the side of the cartridge being inspected, in association with video camera 60. The video data is gathered from these blocks 126–130 by image processing computer 44 which feeds control and operation computer 36 at point "A".

Control and operation computer 36 provides control of imaging and handling subsystem 14 via servo control and feed timing blocks 132 and 134. The latter of these together with I/O block 136 provide position-driven asynchronous control of feeding subsystem 12. This enables the system to advance between various operations directly upon receipt of an indexed rotation signal from plate rotation interruption sensor block 137 in imaging and handling subsystem 14. This signal repeats itself at each station in the indexed rotation of plate 24, and in the event of its absence after a predetermined time delay since the previous station, a supervisory control signal disconnects incoming power in electrical mains block 106, shutting the systems down.

Statistical computations based on video data received from image processing computer 44 are performed by control and operation computer 36 in block 138 and can be obtained by the operator on printer 42.

Imaging and handling subsystem 14 receives servomechanism control commands from control and operation computer 36 at servo interface block 140 which in turn feeds servo amplifier blocks 142 and 144. The former of these controls motors 146 associated with ejection of cartridges through ejection ports 28, and it also controls a spectral filter motor 63 associated with the imaging procedure performed by static head imaging block 128, as described further herein. Servo amplifier block 144 controls motors 64 associated with handling plate 24 and motors 152 associated with the imaging procedure performed by rotating (dynamic) cartridge head imaging block 126, as described further herein. Each of motors 63, 64 and 152 is operated so as to achieve closed loop position control through respective position encoders 154, 156 and 158.

As discussed with reference to FIG. 3*a* and FIGS. 4*a–c*, techniques for insertion of cartridges into the feeding interfaces 26 require that cartridges are provided continuously at the proper rate in order to avoid lack of a cartridge whenever an empty slots 56 in handling plate 24 is available. Interface magazine 26 in subsystem 12 supplies the necessary status signals to the control and operation computer 36 for proper control of cartridge insertion via solenoid and optical sensor block 160, associated with optical sensors 72, 73, 75 and 76. Feed solenoid 77 operation depends on status information about the min-max level control of cartridges in interface magazine 26 as provided by optical sensor block 164 through optical sensor interface block 166.

In accordance with the results provided by image processing computer 44 to control and operating computer 36, feed timing block 134 sends control signals to cartridge ejection control block 168, which in turn operates through servo amplifier block 142 to effect ejection motor 146 operation. Ejection motor 146 operation ceases upon control block 168 receipt of the control signal provided by end-of-travel sensor 170. Optical sensor 172 provides status information about the presence/absence of a cartridge through optical sensor interface block 174 to coordinate cartridge ejection control block 168 operation.

Figure 8:
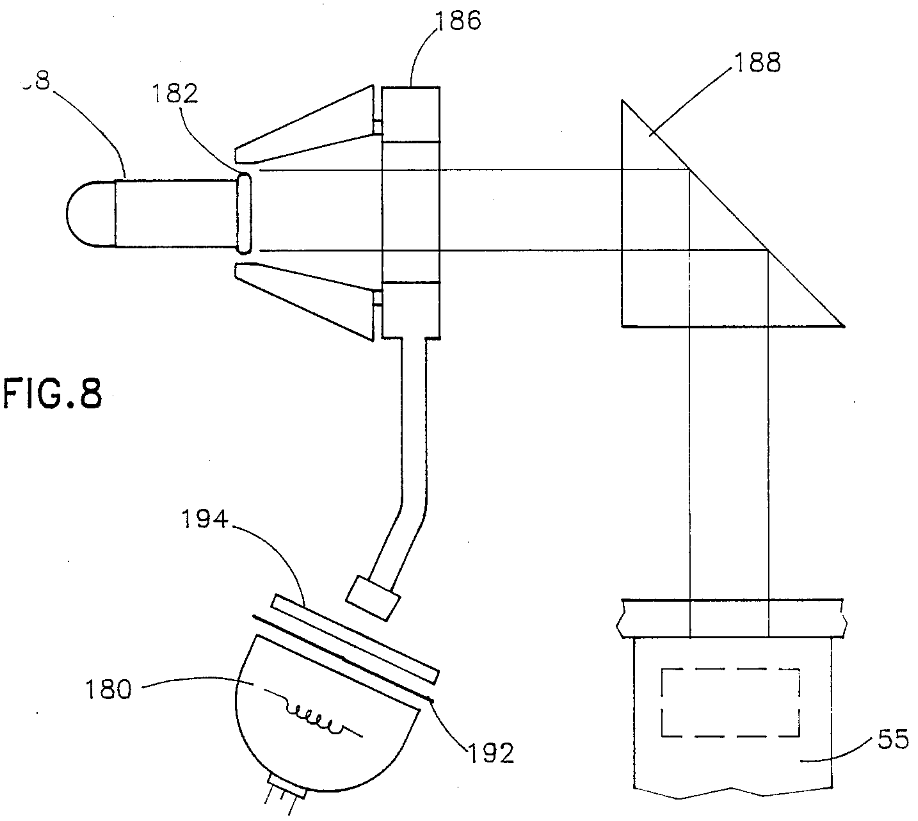
FIG. 8 is a schematic representation of a cartridge head imaging procedure performed by the image and handling subsystem of FIG. 2 when the cartridge is held in a static position.
Figure 9:
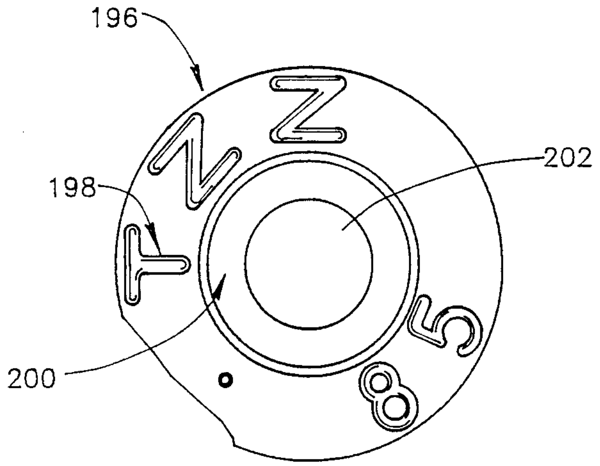
FIG. 9 is a schematic representation of the head showing the appearance of the features extracted by the head imaging procedure of FIG. 8.
Figure 10:
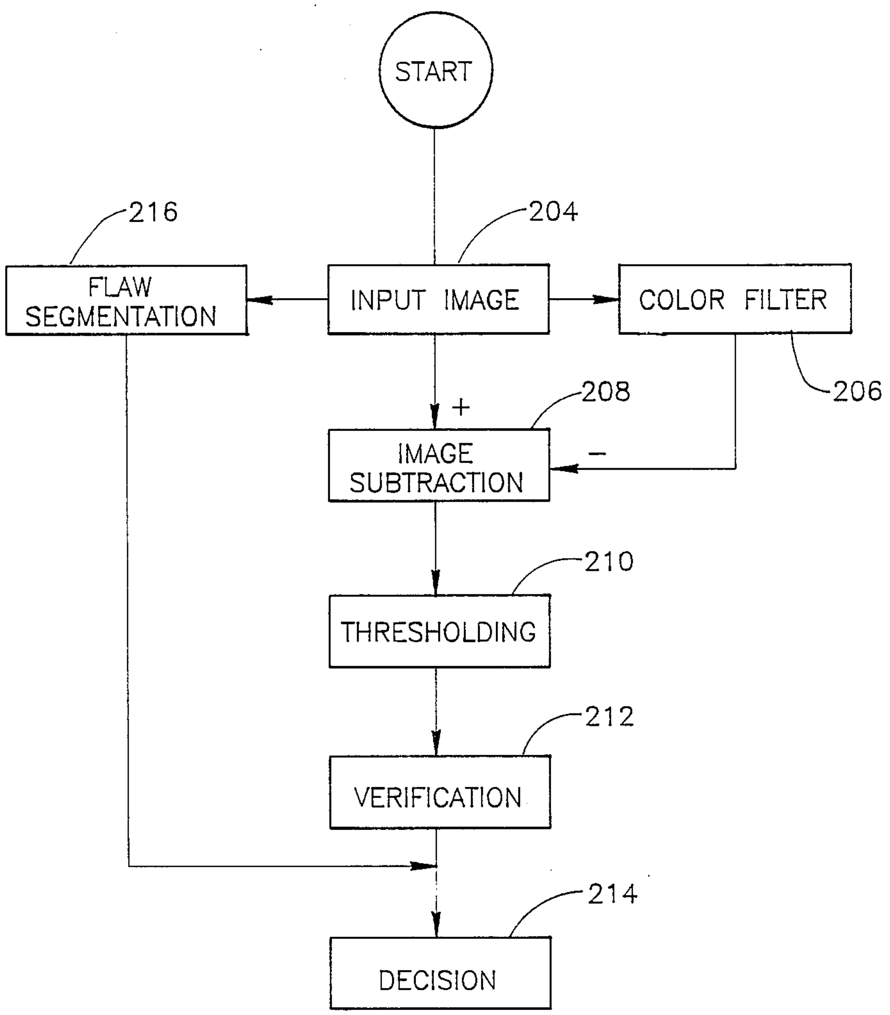
FIG. 10 is a flowchart of an image processing algorithm applied to detect the presence of waterproofing in the features extracted by the head imaging procedure of FIG. 8.

Referring now to FIGS. 8–20, there are shown schematic representations of cartridge imaging procedures and the features extracted thereby, along with flow chart representations of the image processing algorithms used by the inspection system of the invention. The purpose of the inspection system is to detect and identify a wide variety of manufacturing defects. The imaging procedure of FIGS. 8–10 is performed when the cartridge is held in a static position, and is used to determine the presence of a complete waterproofing-varnish ring around the primer and surface flaws associated with the primer. The imaging procedures of FIGS. 11–20 are performed when the cartridge is dynamically rotated and these are used to detect a variety of surface flaws.

In FIGS. 8–10, a static head imaging procedure is shown. This procedure is typically performed when handling plate 24 is rotated to the first of its indexed imaging stations after a new cartridge has been inserted, where the cartridge is held static for 120 millisec. In this first imaging station, a light source 180 (part of 62) illuminates the head 182 of cartridge 68 via a ring light fiber optic guide 186 which provides a ring of light adjusted to match the circular primer area. A prism 188 directs reflected light from this area to an area CCD video camera 190, such as a Sony type XC38. A heat absorber 192 removed unwanted heat from the illumination provided by light source 180, and a rotatable color filter 194 associated with spectral filter motor 63 (FIG. 3*b*) is used to control the spectrum of the light used to illuminate cartridge head 182.

The features of cartridge 68 shown in FIG. 9 and extracted by the imaging procedure of FIG. 8 include the rim 196, stamped letters and numerals 198, groove 200 and primer area 202. Since the waterproofing in groove 200 around primer area 202 is a colored but transparent varnish, two frames of the reflected light are analyzed, one using color filter 194 to eliminate the color of the varnish. As described with respect to FIG. 10, the image processing algorithm for this procedure then subtracts one of the two frames from the other so that what remains is only the ring of the varnish.

FIG. 10 shows a flowchart of an image processing algorithm used in the preferred embodiment to detect the presence of the waterproofing varnish in groove 200. Input image block 204 receives two frames of video data provided by camera 55, wherein one frame is normal and the other has been derived from color filter block 106 using color filter 194. The latter of these two frames is subtracted from the former in image subtraction block 208, providing the image of the varnish only. The thresholding block 210 decides which pixels in the image belong to the varnish, providing a binary image comprising the varnish and the background. The verification block 212 checks that a complete varnish ring has been detected, the result being fed to the decision block 214 which controls the appropriate ejection port 28.

The input video image is also fed to flaw segmentation block 216, which detects structural flaws such as dents in the primer area on the head 182. This is done using a difference-of-averages technique to compare the differences in the pixel intensity averages of the image. The decision block 214 scans the results of this processing to identify if dents are present, with appropriate signals being provided to control ejection ports 28.

Referring now to FIGS. 11–20, there are shown the dynamic imaging procedures and associated flowcharts utilized for inspecting the head 182 and side of the cartridge 68, including photographs of the video images produced. This portion of the inspection system is used to detect and identify a large variety of surface flaws on the metal surface of the cartridge. A short list of the most common flaws is given in Table 1. Beside the list of flaws, the table provides a brief description of their appearance to the human eye and their rejection class (minor–critical) according to the MIL-STD 636 specifications.

There are three main issues for consideration in conjunction with Table 1:

1. Flaw size, contrast and shape are not always directly related to its severity. For example, a short and narrow split (1 mm×0.2 mm) is a critical flaw, while at the same time a much longer scratch (15 mm×0.1 mm) is of minor severity only. Another example is an extensive (5 mm×5 mm) dirt path which should be classified as minor, while a dent, of comparable size is usually classified as major. This observation leads to the conclusion that the inspection system must firstly identify the type of flaw and only then decide on its class of severity.

2. Flaw sizes span a wide range of values, starting from flaws numbering a very limited number of pixels and up to flaws encompassing the whole object.

3. In order to identify the type of flaw, a set of primitives is needed. These are based on the nature and physics of the relevant flaws. Local intensity variations in the image are caused by changes in the returned light from the surface. Since the surface behaves in a mirror like manner in the flaw free area, incident light is reflected into a predetermined angle and detected by the camera.

TABLE 1

A list of the most common flaws.

| Flaw | Severity | Characteristics |
|---|---|---|
| scratches | minor/major | random location and orientation, variable contrast. |
| splits | critical | small, mostly axially oriented |
| scale | minor/major | irregular shape |
| dents | minor/major | random size (>1 mm) irregular shape |
| dirt | minor | irregular shape |
| corrosion | minor/major | irregular shape |
| perforation | critical | random size irregular shape |

In other words, by assuming a constant reflection across the surface the same amount of light will be reflected independent of the location, producing a uniform image. Local intensity changes can be caused by changes in the returned light from the metal surface. Three basic processes can take place:

A. Structural changes in the metallic object (e.g. dents) cause light to be deflected from the normal orientation. This will cause a decrease in the detected light in one region, next to an increase in an adjacent region. Magnitude and rate of these changes are directly related to flaw's size, border gradient and orientation. Topological attributes can thus be estimated from reflectance measurements, as described in the papers entitled "Metal Surface Inspection Using Image Processing Techniques", H.S. Don et al., IEEE Transactions on Systems, Man and Cybernetics, Vol. SMC-14, No. 1., Jan.–Feb. 1984, and "Visual Inspection of Metal Surfaces", J.L. Mundy et al., Proceedings of the Fifth International Conference on Pattern Recognition", 1980.

B. Dirt and paint attached to the metallic surface cause incident light to be absorbed. In this case, less light is reflected back to the camera and the flaw appears as a sudden darker area.

C. Corrosion and anneal are intrinsic changes in the metal's texture and cause the metal to be less "mirror like" than usual. More light is scattered (some of its also absorbed) from the region and the camera, located to collect the reflected light, collects less light than from flaw free zones. The defect is thus characterized by a gradual reduction in the reflected light (unlike in the previous case where the transition is sharp). In summary, manufacturing defects can be analyzed as follows:

Defects can in principle be characterized by measurements of the attributes of the reflected light:

Flaw type must be identified prior to decision of severity class.

Analysis must be done on a multi-resolution scale.

These facts serve as the basis for the overall design of the optical system which is used for the dynamic imaging procedures of FIGS. 11–20. From the previous description of the various types of surface defects it can be shown that surface defects created by acid and annealing would be best viewed under completely diffuse illumination. On the other hand, defects such as dents would be best viewed under uni-directional illumination. In view of the contradictory requirements, the illumination system design according to the present invention constitutes the best compomise and permits differentiation of flaw types in a single image.

The optical system, which is now described, is designed so as to achieve high contrast images, with capability to generally differentiate between flaws of different sizes and physical characteristics. The difficulty here is that detected flaws, for example, a scratch and a split on the one hand, and a stain and an acid spot or a hole on the other hand, all look two dimensionally the same. Discrimination between flaws which are detected is achieved by the interplay of light and shadow.

In accordance with the present invention, image processing algorithms are used to discriminate between these flaws and others using the technique of off-specular reflections from a surface. While a specular reflection is a point reflection, an off-specular reflection is taken from the side, not directly into the reflection, and this provides the right information in order to allow the image processing to decide what type of flaw is present. The description of the optical system is followed by a description of the image analysis algorithms.

Figure 11:
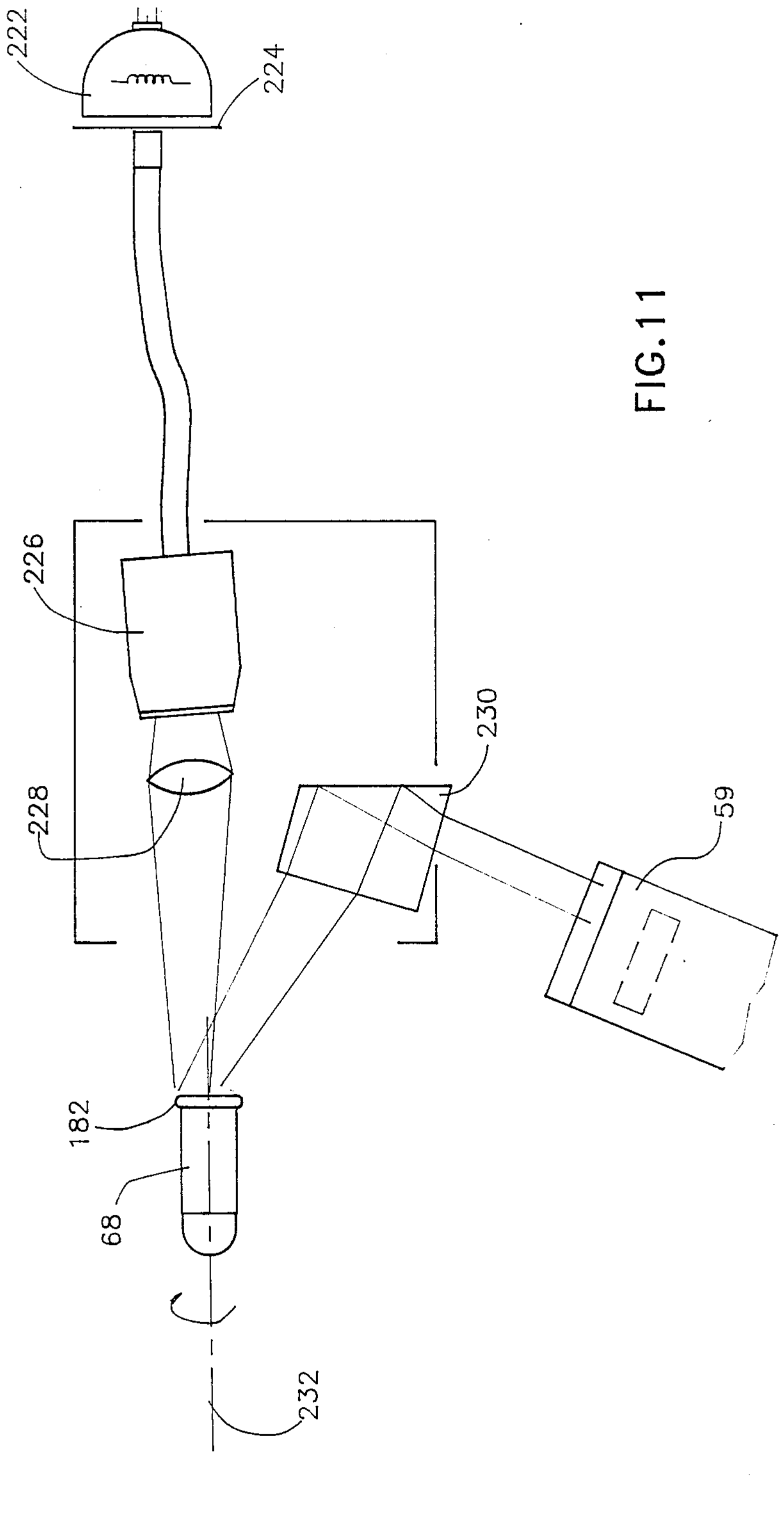
FIG. 11 is a schematic representation of a cartridge head imaging procedure performed by the image and handling subsystem of FIG. 2 when the cartridge is dynamically rotated.

Referring now to FIG. 11, there is shown a schematic representation of a cartridge head imaging procedure performed when the cartridge is dynamically rotated. This procedure is typically performed when handling plate 24 is rotated to the second of its indexed imaging stations, where the cartridge is rotated for 180 millisec, (see FIGS. 13*a*–*b*). The pair of standard video line CCD cameras 59 and 60, such as Fairchild-Weston Model 1300R, are provided to gather video data for respective head and side (FIGS. 13*a*–*b*) imaging procedures. The light source 222 used (part of 62) is a halogen lamp which provides light through a heat absorber 224 to a linear fiber optics conduit 226. The input side of the fiber is of circular shape to match the symmetrical energy distribution of light source 222. The illumination end of the fiber is focused through a lens 228 onto the cartridge head 182 and the reflected light is passed through a prism 230. As the cartridge head rotates on axis 232, a narrow image line of the rotating surface area is transformed by camera 59 into video signals which are provided in a rectangular standard video format.

Figure 12:
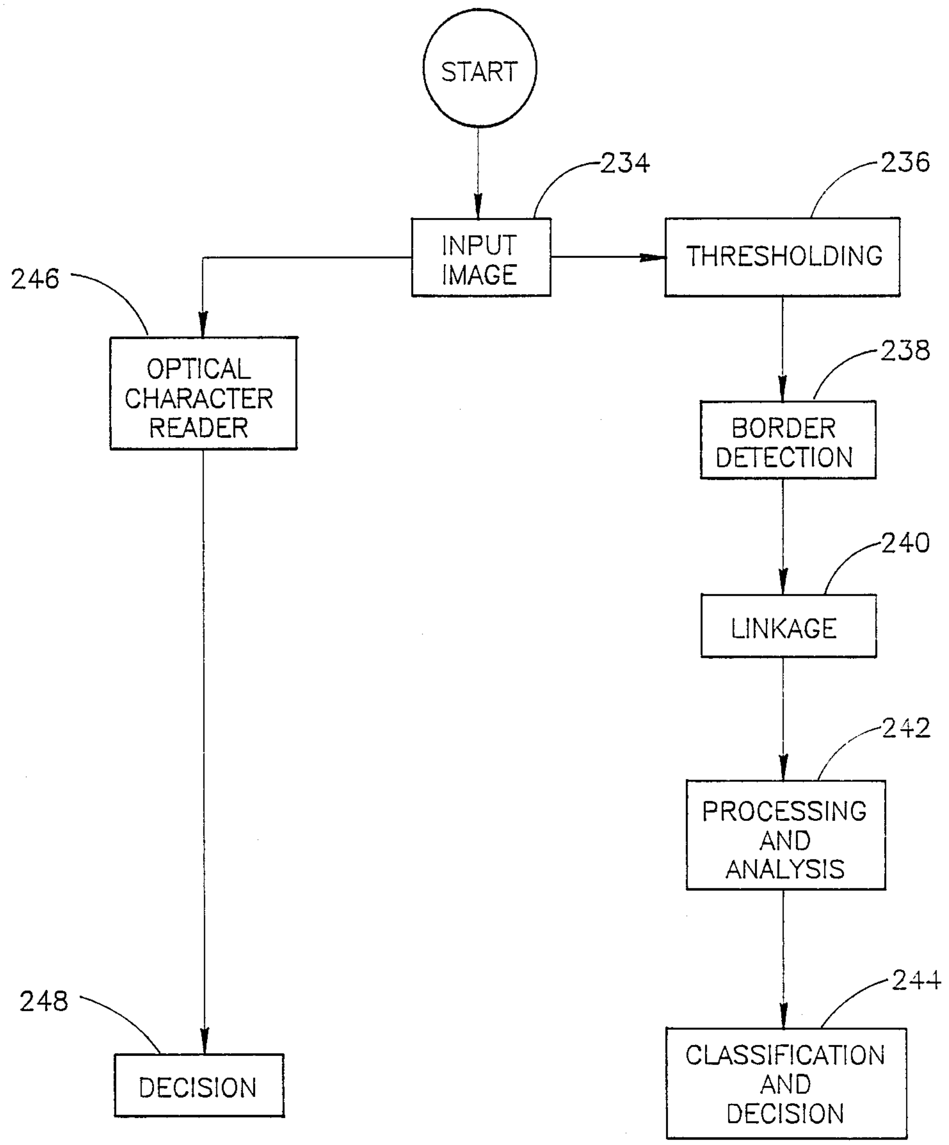
FIG. 12 is a flowchart of an image processing algorithm applied to detect the flaws in features extracted by the cartridge head imaging procedure in FIG. 11.

FIG. 12 shows a flowchart of an image processing algorithm used to detect flaws in cartridge head 182 per the procedure of FIG. 11. The right hand branch of the flowchart is used to detect flaws in the contour of rim 196 (FIG. 9) and the inner two annular rings of head 182. In this technique, the input image block 234 received from camera 59 is fed to thresholding block 236 to differentiate between the background and the image itself. A border detection block 238 extracts the border between the background and the image, and this leaves three vertical lines representing the three annular rings including rim 196.

This information is fed to linkage block 240 which completes these lines where they are broken, after which processing and analysis block 242 verifies these lines with regard to location, straightness and completeness. Classification and decision block 244 decides the classification in accordance with the flaws detected, such as dents or nicks in rim 196. Appropriate control signals are then provided to operate ejection ports 28.

The left hand branch of this algorithm uses the same input image block 235 information and provides a head stamp detection function in optical characteristic reader block 246. A preprocessing stage of this block 246 enhances the contrast in the characters before reading them and comparing with the string of characters which is expected in accordance with a priori knowledge of the cartridge manufacturer's markings. Errors in the optical character readings indicates a manufacturing defect for use by the decision block 248 in controlling the ejection ports 28.

Figure 13A:
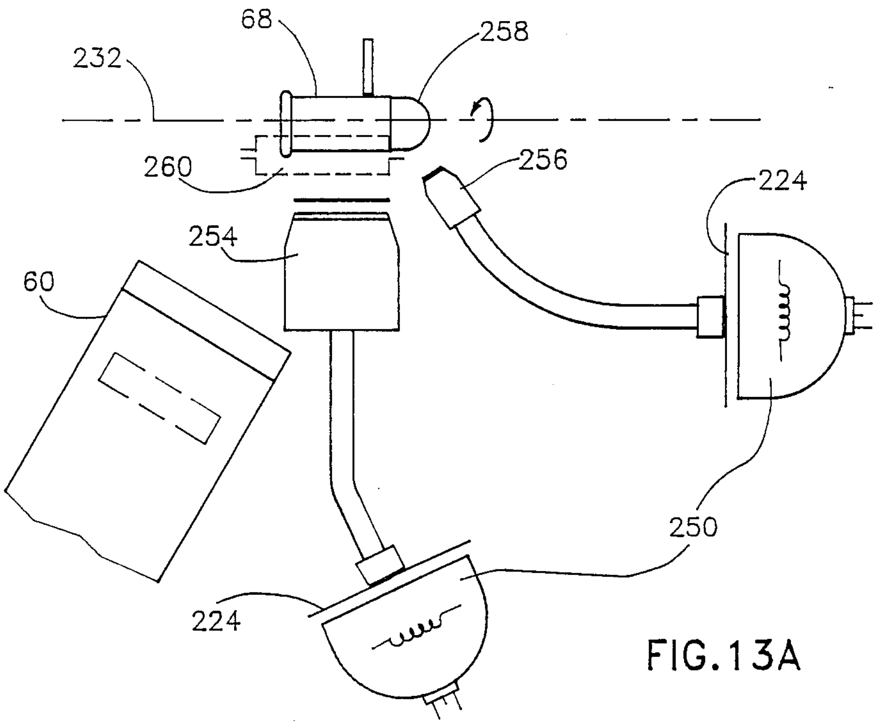
FIGS. 13*a–b* are schematic representations of a cartridge side imaging procedure performed by the image and handling subsystem of FIG. 2 when the cartridge is dynamically rotated.
Figure 13B:
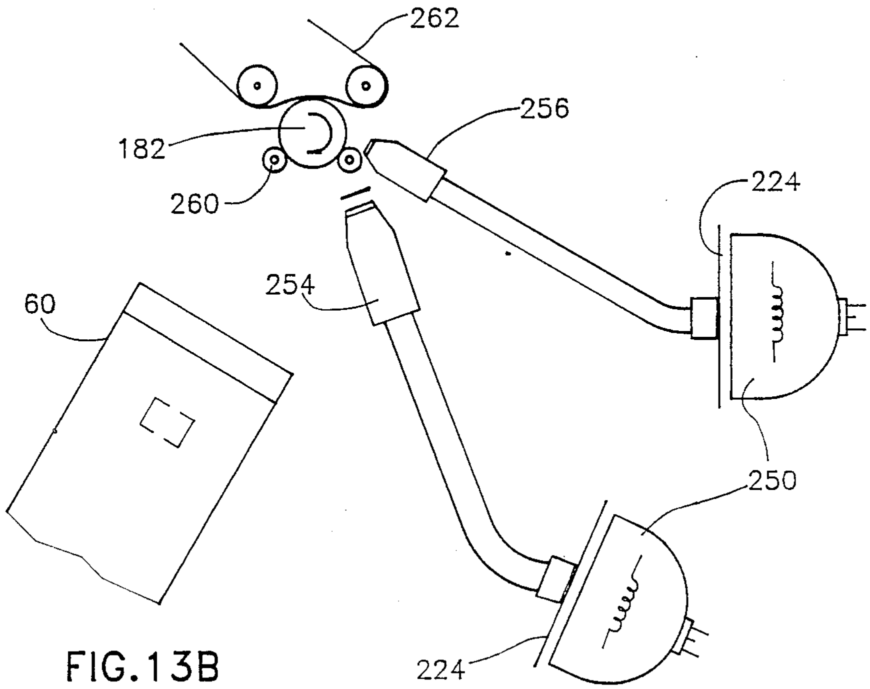

Referring now to FIGS. 13*a*–*b*, there are shown respective side and rear view schematic representation of a cartridge side imaging procedure performed when the cartridge 68 is dynamically rotated. The optical system is similar to that of FIG. 11, with a plurality of light sources 250 (part of 62) and associated fiber optic guides 254 and 256 for illuminating the entire side of cartridge 68 including the curvature of the bullet portion 258. The illumination end of fiber optic guide 254 has a slit like appearance.

The location of fiber optic guides 254 and 256 relative to the cartridge 68 are determined in accordance with the abovementioned requirements for off-specular reflections to obtain the optimal differentiation for all flaws. A pair of rollers 260 and a rotating belt 262 of the polyester-nylon type which are located in the dynamic imaging station provide for rotation of cartridge 68. The cartridge 68 rotates in front of the camera 60 in such a way that upon one revolution all of its surface is captured as an input to the image processing computer 44. As the cartridge 68 is axially rotated on axis 232, a "peeled image" is provided to camera 221 in a standard video format.

Referring now to FIGS. 14–20, there are shown flowcharts of the image processing algorithms used to analyze the flaws detected in the dynamic imaging procedure of FIGS. 13*a*–*b*, and photographs of the video images extracted. Image segmentation is the basis of the image analysis technique. Segmentation consists of partitioning the image into regions having similar properties (features). For this purpose operators capable of characterizing these features are needed. Since several distinct physical processes take place, and since they occur in different scales, several operators are needed for that task.

There are generally two major approaches to image segmentation: edge and region based, respectively. In the first one local intensity discontinuities are enhanced and are further combined to form complete borders. The second approach "colors" image pixels according to some properties of neighboring pixels. Because of the diversity of flaws and their characteristics, the present invention incorporates the two techniques to provide an optimal system.

Figure 14:
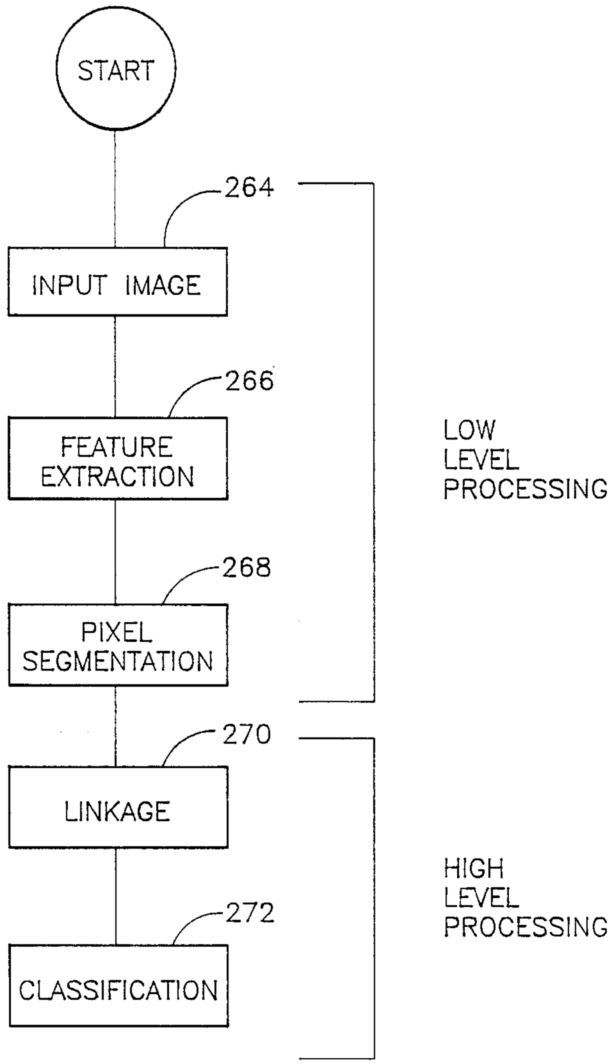
FIGS. 14, 15 and 18 are flowcharts of image processing algorithms applied to detect flaws in features extracted by the cartridge side imaging procedure of FIGS. 13*a–b.
Figure 15:
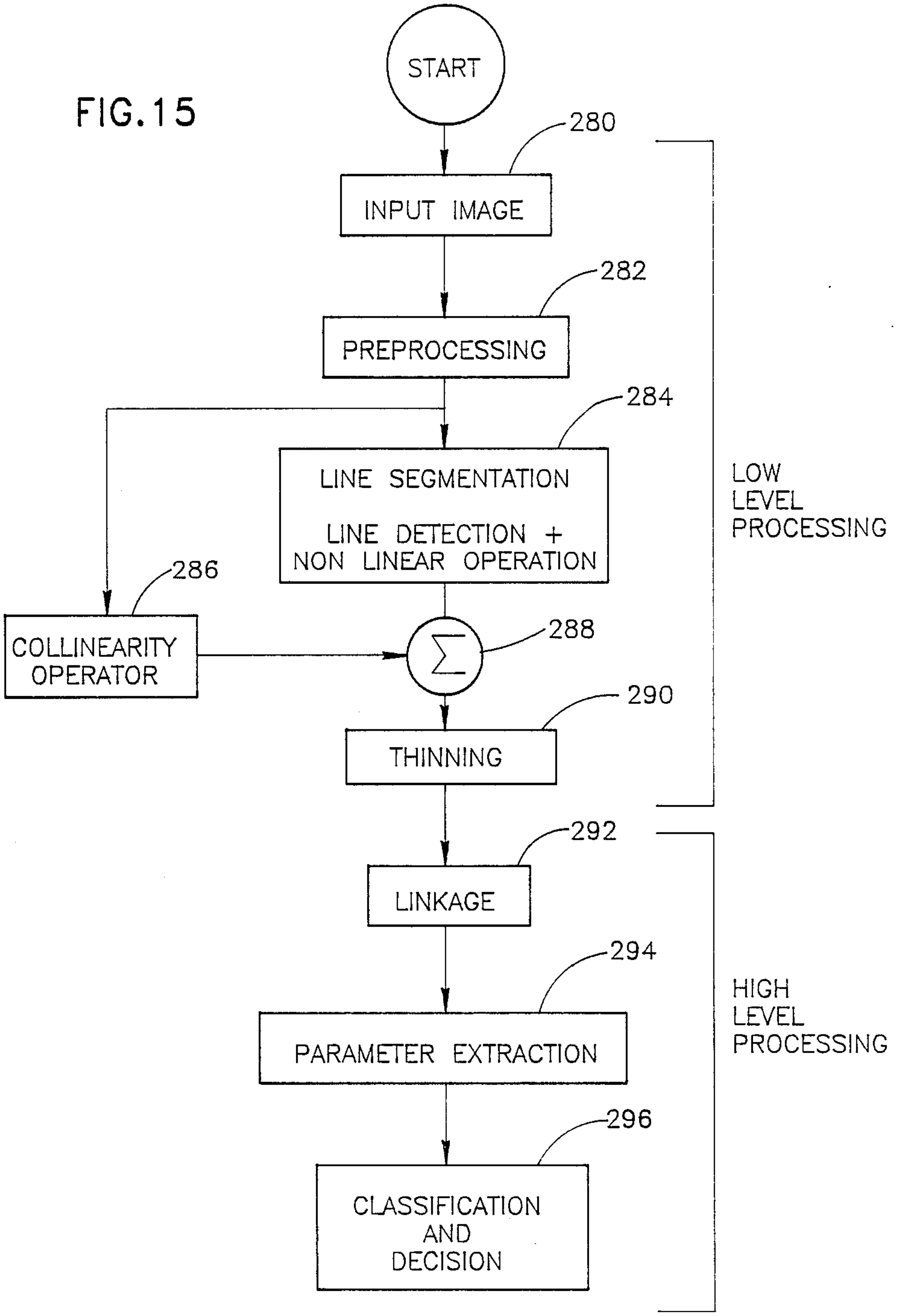
Figure 18:
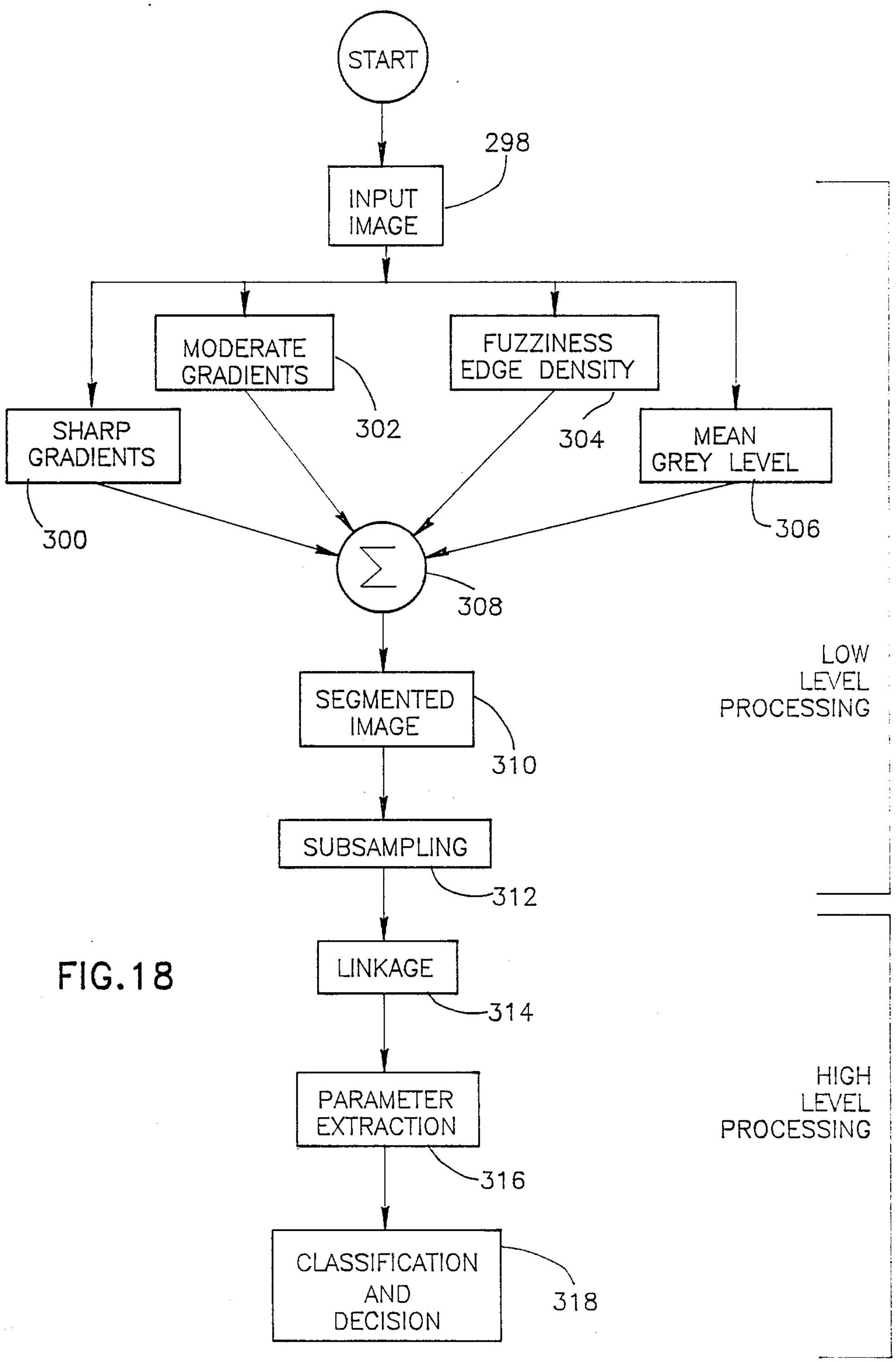

The overall design of the system is shown in FIG. 14, which represents the structure of the algorithms in flowcharts in FIGS. 15 and 18. Generally, the algorithms are divided into two parts: the first stage, termed "low level processing", is responsible for the major data reduction to a more descriptive representation which can be used more effectively by the second stage—termed "high level processing". This stage is responsible for primitive extraction, classification and decision.

Implementation of these algorithms may be achieved in accordance with skill of the art electronic design and programming techniques. The "low level processing" algorithms may be implemented in hardware such as that marketed and made available by Datacube, Inc. of Peabody, Mass., under the tradename "Max Video." The "high level processing" may be implemented by virtual software blocks executed by the CPU in image processing computer 44.

In FIG. 14, the input image block 264 received from the video camera 60 is fed into a feature extraction block 266 where prominent surface features are extracted and enhanced. The feature extraction block 266 is characterized for two types of flaws, associated with "fine" features and "coarse" features. The pixel segmentation block 268 decides whether the feature which has been extracted is meaningful or not. If it is considered to be a significant feature, it is labelled as such. The linkage block 270 associates several labelled regions into distinctive phenomena. The classification block 272 decides whether these phenomena are flaws and what rejection classification should be assigned to them.

Since splits are classified as critical defects, are usually small and might appear with a low constant, fine features segmentation is treated as described in detail with regard to FIG. 15. Detection of "blob like" flaws such as dents and acid is described in detail with regard to FIG. 18 dealing with coarse feature segmentation.

The purpose of the fine feature segmentation algorithm shown in FIG. 15 is to delineate and identify the "linear" or "line like" structures in the image (i.e. roof/line edges), created by flaws such as scratches, splits and scales. These structures are those which are adequately represented by a central skeleton and are not wider than few pixels.

After the input image block 280, preprocessing block 282 applies a 3 by 3 linear low pass filter with weighted coefficients to the image in order to reduce local textural variations. Line segmentation block 284 takes the smoothed image and convolves it with four 7×7 directional ridge derivative masks. The convolution operation delivers four edge images, as output. The four outputs are evaluated based on a pixel by pixel maximum, which is recorded together with the respective orientation. The choice of the mask coefficient, their size and the choice of the number of directions used is of importance and depends on the particular application. Applicants have found that directional operators give better results than those with circular symmetry, especially for low contrast structures. Applicants have also found that four orientations were adequate to resolve lines in all orientations.

Figure 16:
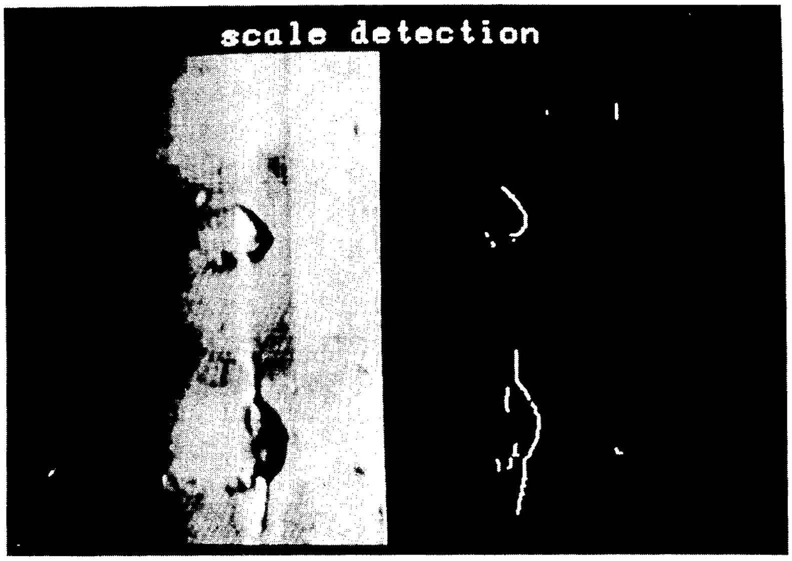
* and FIGS. 16–17 and 19–20 are photographs showing typical video images of surface flaws on the metal surface of inspected cartridges along with the results of the associated image processing.
Figure 17:
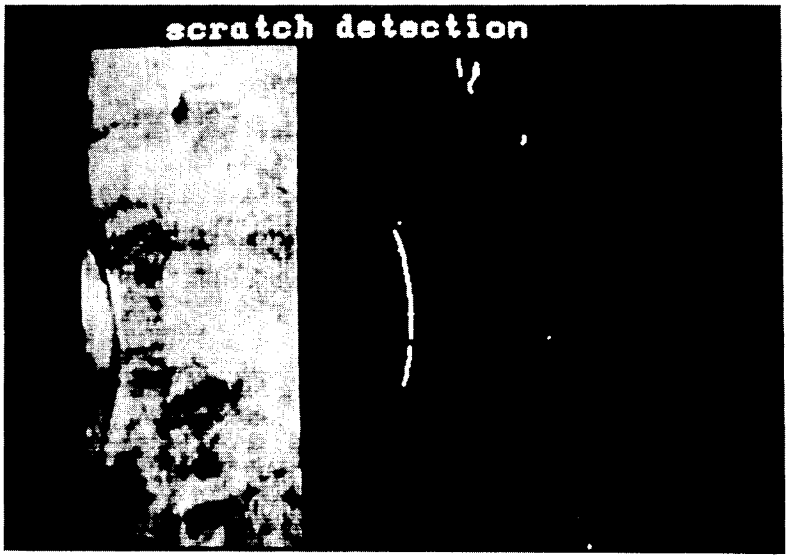

FIGS. 16–17 show photographs of the video image for the dynamic imaging procedure and the results of the segmentation process at the output of line segmentation block 284, for scale and scratch detection.

The edged image is then subsequently thresholded in summation block 288. In order to preserve low contrast lines, the approach described by J. Canny was adopted as described in the paper entitled "Optical Edge Detector", J. Canny, MSc. Thesis, Mass. Inst. of Tech., 1980. In collinearity operator block 286, each edge point in summation block 288 is scored based on some measure of collinearity within its neighborhood. If the collinearity condition does not exist, the edge point does not survive. Otherwise, the point is multiplied by a factor proportional to some measure of collinearity and contrast and thresholded in block 288 by an a priori determined number.

The collinearity operation of block 286 performed in block 288 leads to a new edged image. Since the collinearity conditions just described will be satisfied only along "ridge/valley like" edges, step edges and isolated noisy points will be eliminated. This operation also allows control of the overall threshold for each point locally, a property which is important for the preservation of low contrast edges. The summation block 288 combines the outputs of collinearity block 286 and line segmentation block 284 and feeds the output of thinning block 290.

In thinning block 290, an edged imaged is produced for which there is only one response to a single edge. The algorithm is based on morphological rules, and is applied iteratively, as described in the paper entitled "A Fast Parallel Algorithm for Thinning Digital Patterns", T.Y. Zhang et al., Communications of the ACM, Vol. 27. p. 236, 1984. Two passes of the algorithm are necessary to thin the pattern of its skeleton.

In linkage block 292, the list of edge points is transformed to a smaller set of descriptors that will serve to the following stage of parameter extraction. In other words, during this stage the edge points are rebuilt into line segments and stored as entities termed bins.

Since the edge points are not ordered according to their location (adjacent points can be located far away from each other in the list), a fast proximity check algorithm and coding facilities are applied to make the process fast. Linkage block 292 algorithm allocates a new bin for any new point which is not close to any previously located bin (to its end). Most of the bins remaining at the end of this stage represent full/part of line segments. At this stage line length thresholding is performed. All bins which contain less than a specified number of points are rejected as noise. For each bin a set of parameters is computed. These parameters are listed in Table 2A.

The parameter extraction block 294 algorithm provides global discriminative information on the entire flaw by combining proximate bins. Due to the nature of raster scanning, divergence/convergence of lines, not all proximate edge points could have been combined at the first stage. A similar fast proximate check algorithm is used for this purpose. Following each combination, the appropriate parameters are updated. At the end of this stage several additional parameters for each line segment are calculated as listed in Table 2B.

TABLE 2

List of parameters calculated for each line segment.

| 2A. Parameters calculated in the first link: | |
|---|---|
| $x_{beg}$, $y_{beg}$ | coordinate of the first point |
| $x_{end}$, $y_{end}$ | coordinate of the last point |
| $x_{min}$, $x_{max}$ | min and max of x coordinate |
| count | number of points |
| orientation | orientation of the line between end points. |
| chain code histogram | number of chain codes in each orientation |
| grey level | average grey level of points comprising the line |

| 2B. Parameters calculated after the second linkage: | |
|---|---|
| area | $(x_{max} - x_{min}) * (y_{end} - y_{beg})$ |
| percent | proportional distribution of chain code histogram |
| density | area/count |

In classification block 296, classification is done by matching features of each bin with a model driven statistical tree. The tree classifier consists of a set of binary decision nodes. Thresholds and classification rules are established using training data. The classification is used to provided appropriate control signals for ejection ports 28.

As mentioned above, an overview of the algorithm used to detect all "blob like" structures in the image (dents, paint, acid, etc.) is presented in the flowchart of FIG. 18. The choice of the features is guided by the observation that "blob like" flaws are amorphous in their shape and their boundary cannot be described with simple mathematical tools.

In this technique, the "low level processing" begins with input image block 298 which is received from camera 60. Block 298 is fed to feature extraction operation blocks 300, 302, 304 and 306, where a set of features is computed at the pixel level at several resolutions. The features consist of the following:

1. sharp edge gradient—line detector with small support
2. moderate edge gradient—Roberts edge detector (wider support)
3. "fuzziness"—edge gradient density number of edge points window (with a wide support).
4. grey level—mean grey value in a small window After the complete set of features is calculated for each pixel in the image, these features are summed in summer block 308 in accordance with a predetermined weighting coefficient for each. Each pixel is assigned with the singular most probable feature to form the segmented image which is fed to the segmented image buffer block 310.

This is done by deciding which feature best describes the pixel and its immediate neighborhood. For this purpose a probabilistic technique is applied and the "strength" of each feature is caculated. This is based on the image model (a priori information such as range of gradients, grey level distribution, etc.). Once the decision has been made, the 6×6 neighborhood of the pixel is "colored" with that feature. The image is then resampled to reduce dimensionality. This delivers a segmented "image" of a greatly reduced size for high level processing. The subsampling block 312 feeds the linkage block 314 with reduced information where labelled pixels represent a region in the segmented image.

Figure 19:
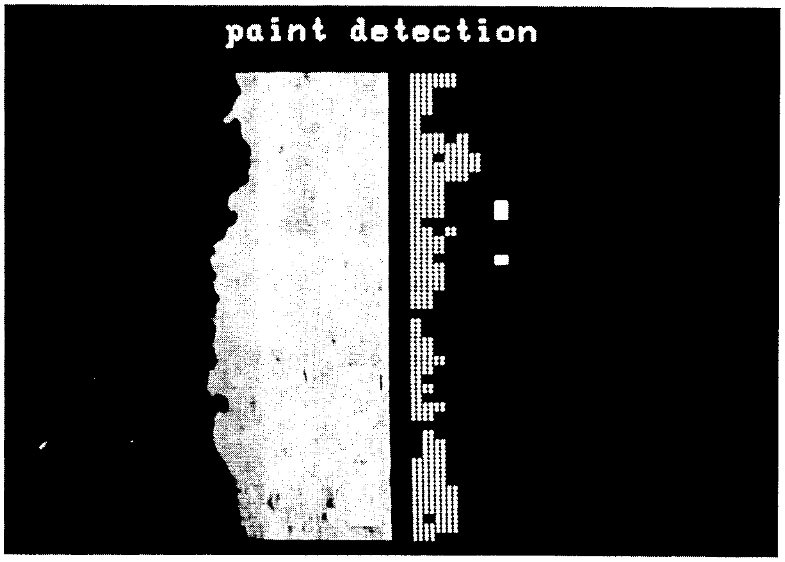
Figure 20:
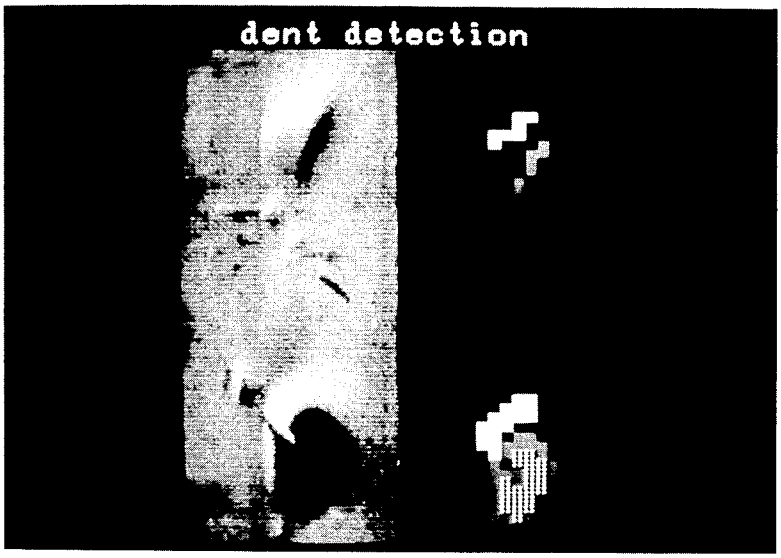

FIGS. 19-20 show photographs of the video image for the dynamic imaging procedure and the results of the segmentation process at the output of subsampling block 312, for paint and dent detection.

The "high level processing" begins with linkage block 314 algorithm which serves to recombine proximate features into single entities—the defects. This is done by transforming the image in the features space into entities (bins) each representing distinct flaws. For that purpose a run-length encoding algorithm is applied which constructs a list of bins out of the image. For each bin, the following parameters are calculated in parameter extraction block 316:

1. Number of sharp gradients
2. Number of moderate gradients
3. Histogram of mean grey value distribution
4. Density of sharp gradients.

The classification block 318 algorithm is identical to the one described in the fine segmentation section (FIG. 15). The classification is used to provided appropriate control signals for ejection ports 28.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

We claim:

1. A small arms ammunition inspection system for cartridges, cases, bullets and the like, said system comprising:

interface means for receiving a supply of ammunition cartridges and providing each cartridge with a predetermined orientation;

conveying means for locating each of the cartridges for inspection in at least one imaging station;

means for imaging surface areas of each cartridge in said imaging station to provide video surface feature data associated therewith; and means for processing said video surface feature data to detect the presence of a predetermined set of characteristics and provide output signals in accordance therewith, said conveying means being operated to sort each of said inspected cartridges in accordance with said output signals, said conveying means further comprising means for maintaining cartridges in individual slots of a handling plate in a static orientation when said imaging means is operated, and wherein said imaging means comprises an optical system comprising:

at least one illumination means;

means for direction light from said illumination means to the head area of said cartridge; and means for directing reflected light from said head area to at least one area CCD camera for producing video signals in accordance with surface features of said head area, and wherein said system also comprises a removable color filter between said illumination means and said head area and wherein said video surface feature data processing means is operated to detect the presence of a complete waterproofing/varnish ring around the primer cap in said set of characteristics, said detection operation comprising subtraction of said video signals produced when said color filter is not present.

2. The system of claim 1 wherein said interface means comprises at least one interface magazine for feeding cartridges vertically from a cartridge supply source and having a longitudinal zig-zag construction defining internal walls against which cartridges move from the top to the bottom with reduced potential energy.

3. The system of claim 2 wherein said interface means comprises a plurality of interface magazines for feeding cartridges from a plurality of cartridge supply sources.

4. The system of claim 2 wherein said interface magazine is adjustable for different size cartridges.

5. The system of claim 2 wherein said interface magazine further comprises optical sensors supplying signals used in a min-max level control operation of magazine capacity to provide continuous feeding.

6. The system of claim 1 wherein said conveying means comprises a circular slotted handling plate arranged for indexed rotation between a plurality of feeding, imaging and ejection stations.

7. The system of claim 6 wherein system functions are provided by position-driven asynchronous control with respect to said handling plate indexed rotation.

8. The system of claim 1 wherein said conveying means further comprises means for dynamically rotating cartridges in individual slots of said handling plate when said imaging means is operated.

9. A small arms ammunition inspection system for cartridges, cases, bullets and the like, said system comprising:

interface means for receiving a supply of ammunition cartridges and providing each cartridge with a predetermined orientation;

conveying means for locating each of the cartridges for inspection in at least one imaging station;

means for imaging surface areas of each cartridge in said imaging station to provide video surface feature data associated therewith; and means for processing said video surface feature data to detect the presence of a predetermined set of characteristics and provide output signals in accordance therewith, said conveying means being operated to sort each of said inspected cartridges in accordance with said output signals, said conveying means further comprising means for maintaining cartridges in individual slots of a handling plate in a static orientation when said imaging means is operated, and wherein said imaging means comprises an optical system comprising:

at least one illumination means;

means for detecting light from said illumination means to the head area of said cartridge; and means for directing light from said illumination means to the head area of said cartridge; and means for directing reflected light from said head area to at least one area CCD camera for producing video signals in accordance with surface features of said head area; and wherein said video surface feature data processing means is operated to detect flaws in the primer cap area.

10. A small arms ammunition inspection system for cartridges, cases, bullets and the like, said system comprising:

interface means for receiving a supply of ammunition cartridges and providing each cartridge with a predetermined orientation;

conveying means for locating each of the cartridges for inspection in at least one imaging station;

means for imaging surface areas of each cartridge in said imaging station to provide video surface feature data associated therewith; and means for processing said video surface feature data to detect the presence of a predetermined set of characteristics and provided output signals in accordance therewith, said conveying means being operated to sort each of said inspected cartridges in accordance with said output signals, said conveying means further comprising means for dynamically rotating cartridges in individual slots of a handling plate when said imaging means is operated, and wherein said imaging means comprises an optical system comprising:

at least one illumination means;

means for directing reflected light from said illumination means to at least one of head and side areas of said cartridge; and means for directing reflected light from said at least one cartridge area to at least one line CCD camera for producing video signals in accordance with surface features of said at least one cartridge area.

11. The system of claim 10 wherein said reflected light directing means provides said reflected light in an off-specular fashion from said head area.

12. The system of claim 1 wherein said video surface feature data processing means is operated to detect the presence of visual surface flaws in the cartridge in said set of characteristics.

13. The system of claim 10 wherein said reflected light direction means provides said reflected light in an off-specular fashion from said side area.

14. The system of claim 13 wherein said video surface feature data processing means is operated to detect the presence of visual surface flaws in the cartridge in said set of characteristics.

15. The system of claim 14 wherein a fine segmentation portion of said visual surface flaw detection operation is provided by means for processing low and high level computation algorithms which identify line-like surface flaws, said low level computation algorithm providing major data reduction in said video signals, said high level computation algorithm utilizing the results of said low level computation algorithm to provide said output signals for use by said conveying means in providing said sorting operation.

16. The system of claim 14 wherein a coarse segmentation portion of said visual surface flaw detection operation is provided by means for processing a computation algorithm which identifies blob-like surface flaws to provide said output signals for use by said conveying means in providing said sorting operation.

17. A method of inspecting small arms ammunition such as cartridges, cases, bullets and the like, said method comprising the steps of:

receiving a supply of ammunition cartridges and providing each cartridge with a predetermined orientation;

locating each of the cartridges for inspection in at least one imaging station;

imaging selected areas of each cartridge in said imaging station to provide video surface feature data associated therewith; and processing said video surface feature data to detect the presence of a predetermined set of characteristics and provide output signals in accordance therewith, each of said inspected cartridges being sorted in accordance with said output signals, and wherein a fine segmentation portion of said processing step comprises a low level computation comprising the steps of:

preprocessing said video signals in a low pass filtering operation using weighted coefficients to reduce local textural variations and provide a smoothed image;

providing an edged image based on a convolution operation of said smoothed image;

thresholding said edged image based on a collinearity operation to produce a new edged image; and thinning said new edged image based on an iterative operation applying morphological rules.

18. The method of claim 17 wherein said receiving step comprises the steps of feeding cartridges vertically from a cartridge supply source having a longitudinal zig-zag construction defining internal walls against which cartridges move from the top to the bottom with reduced potential energy.

19. The method of claim 18 wherein said receiving step further comprises optical sensing supplying a min-max level control operation of magazine capacity for continuous feeding.

20. The method of claim 19 wherein said locating step comprises indexed rotation of a slotted handling plate between a plurality of feeding, imaging and ejection stations.

21. The method of claim 20 wherein system functions are provided by position-driven asynchronous control with respect to said handling plate indexed rotation.

22. A method of inspecting small arms ammunition such as cartridges, cases, bullets and the like, said method comprising the steps of:

receiving a supply of ammunition cartridges, and providing each cartridge with a predetermined orientation;

locating each of the cartridges for inspection in at least one imaging station;

imaging selected areas of each cartridge in said imaging station to provide video surface feature data associated therewith; and processing said video surface feature data to detect the presence of a predetermined set of characteristics and provide output signals in accordance therewith, each of said inspected cartridges being sorted in accordance with said output signals, and wherein a fine segmentation portion of said processing step comprises a high level computation comprising the steps of:

thresholding an edged image based on a collinearity operation to produce a new edged image;

linking said new edged image based on a rebuilding and combining operation of line segments therein;

thresholding said line segments to extract features therefrom; and combining like features in a classification operation.

23. A method of inspecting small arms ammunition such as cartridges, cases, bullets and the like, said method comprising the steps of:

receiving a supply of ammunition cartridges and providing each cartridge with a predetermined orientation;

locating each of the cartridges for inspection in at least one imaging station;

imaging selected areas of each cartridge in said imaging station to provide video surface feature data associated therewith, and processing said video surface feature data to detect the presence of a predetermined set of characteristics and provide output signals in accordance therewith, each of said inspected cartridges being sorted in accordance with said output signals, and wherein a coarse segmentation portion of said processing step comprises the steps of:

extracting features from a set of pixel values associated with said video surface feature data, said features comprising edge gradients, edge gradient densities, and mean gray level values;

calculating a strength factor associated with said features based on a probabalistic technique and adjusting said image in accordance therewith;

linking said adjusted image based on rebuilding and combining operation of shapes therein;

thresholding said shapes to extract features therefrom; and combining like features in a classification operation.

* * * * *